(12) United States Patent
Na et al.

(10) Patent No.: US 11,503,445 B2
(45) Date of Patent: Nov. 15, 2022

(54) METHOD AND APPARATUS FOR PROCESSING A REQUEST MESSAGE IN MACHINE-TO-MACHINE SYSTEM

(71) Applicants: Hyundai Motor Company, Seoul (KR); Kia Motors Corporation, Seoul (KR)

(72) Inventors: Young Jin Na, Gyeonggi-do (KR); Min Byeong Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 77 days.

(21) Appl. No.: 17/022,352

(22) Filed: Sep. 16, 2020

(65) Prior Publication Data

US 2021/0084472 A1    Mar. 18, 2021

Related U.S. Application Data

(60) Provisional application No. 62/900,918, filed on Sep. 16, 2019.

(51) Int. Cl.
*H04W 4/70* (2018.01)
*H04W 72/04* (2009.01)
*H04W 74/04* (2009.01)

(52) U.S. Cl.
CPC ............. *H04W 4/70* (2018.02); *H04W 72/04* (2013.01); *H04W 74/04* (2013.01)

(58) Field of Classification Search
CPC ....... H04W 4/70; H04W 72/04; H04W 74/04; H04W 28/26; H04L 67/12; H04L 67/32; H04L 67/16; H04L 67/2828
See application file for complete search history.

(56) References Cited

U.S. PATENT DOCUMENTS

| | | | |
|---|---|---|---|
| 2017/0311308 A1* | 10/2017 | Park | H04W 4/70 |
| 2018/0205804 A1* | 7/2018 | Kim | H04L 12/5601 |
| 2019/0075184 A1* | 3/2019 | Seed, IV | H04L 67/2852 |
| 2019/0230175 A1* | 7/2019 | Wang, IV | H04L 67/26 |
| 2020/0288291 A1* | 9/2020 | Wang | H04L 67/12 |

* cited by examiner

*Primary Examiner* — Jamal Javaid
*Assistant Examiner* — Shawn D Miller
(74) *Attorney, Agent, or Firm* — Fox Rothschild LLP

(57) ABSTRACT

A message processing method performed by a machine-to-machine (M2M) apparatus in an M2M system includes steps of: generating a request message to be transmitted to an M2M entity; transmitting the generated request message to the M2M entity; and receiving a response message for the request message from the M2M entity, where the request message, as a request for a scheduling resource, requests a reservation for the M2M entity or requests a periodic notification.

18 Claims, 13 Drawing Sheets

FIG. 8

| Attributes of \<schedule\> | Description | |
|---|---|---|
| scheduleElement | Each item of the scheduleElement list shall be composed from seven fields of second, minute, hour, day of month, month, day of week and year. | ~801 |
| reservationElement | This attribute indicates time periods information of reservation request. After reservation request is confirmed in reservationStatus attribute, this attribute will be deleted automatically. | ~802 |
| reservationStatus | This attribute indicate reservation status. | ~803 |

FIG. 9

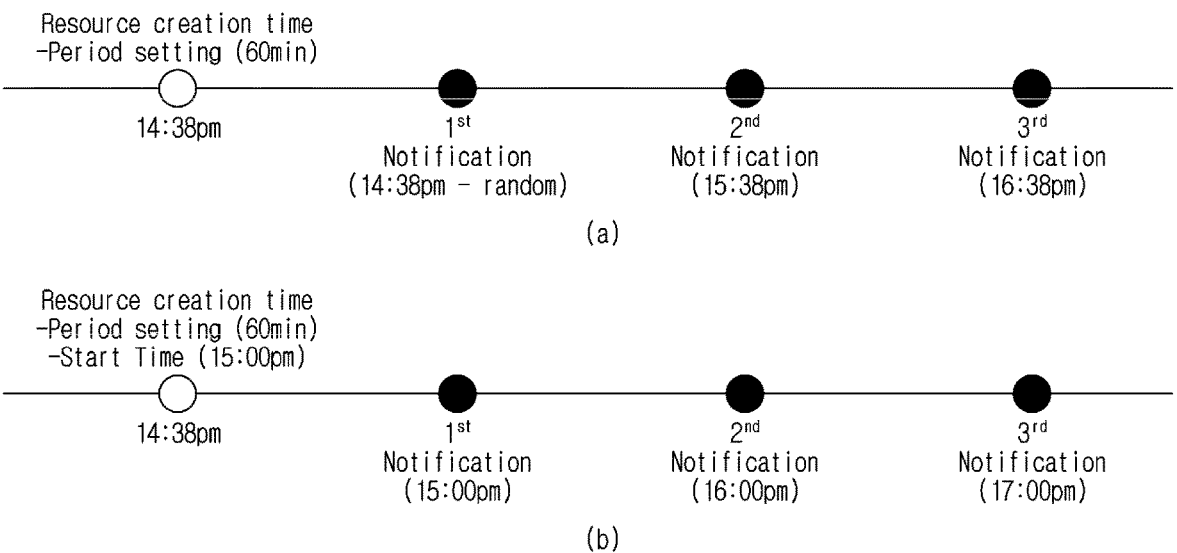

FIG. 10

| Attributes of <schedule> | Multiplicity | RW/ RO/ WO | Description | |
|---|---|---|---|---|
| scheduleElement | 1 (L) | RW | Each item of the scheduleElement list shall be composed from seven fields of second, minute, hour, day of month, month, day of week and year. | ~1001 |
| UsageOfschduleElement | 0..1 (L) | RW | Indicates how the scheduleElement is used. The supported values are : <br>1. period (default) : how long to run the scheduleElement<br>2. startTime: when to start the scheduleElement<br>3. endTime: when to end the scheduleElement<br>4. excludedTimeDuration: optionally indicates when the scheduleElement needs not to be executed | ~1002 |

FIG. 13

| Attributes of <contentInstance> | Description | |
|---|---|---|
| content | Actual content of a contentInstance. This content may be opaque data for understandable with the help of the contentInfo. This may, for example, be an image taken by a security camera, or a temperature measurement taken by a temperature sensor. If the value of this attribute is "reference", the actual content is the same as the contentInstance indicated in "refContentInfo" attribute. | ~1301 |
| refContentInfo | This attribute indicates contentInstance access information of other prior content information when content attribute indicates "reference". | ~1302 |

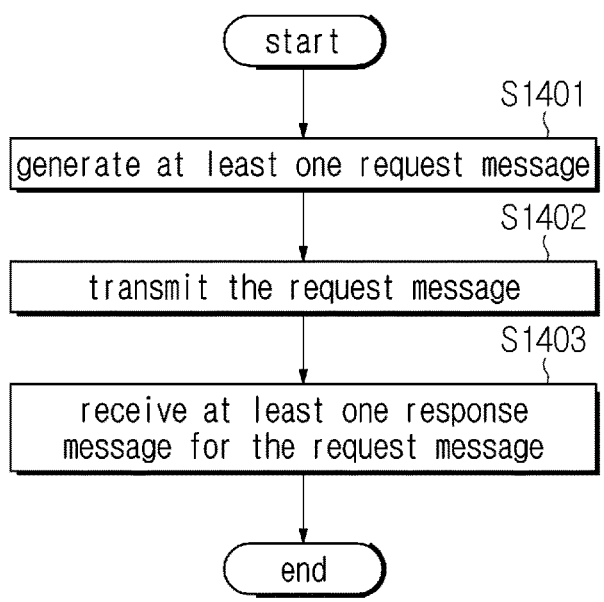

FIG. 14

METHOD AND APPARATUS FOR PROCESSING A REQUEST MESSAGE IN MACHINE-TO-MACHINE SYSTEM

CROSS REFERENCE TO RELATED APPLICATION

The present application claims the benefit of U.S. Provisional Patent Application No. 62/900,918, filed Sep. 16, 2019, the entire contents of which are incorporated by reference herein.

BACKGROUND

(a) Technical Field

The present disclosure relates to a method and apparatus for processing a request message in a machine-to-machine (M2M) system. In the present disclosure, processing a request message may include setting periodic notification, or making a reservation, or reducing the repetitive contents overhead.

(b) Description of the Related Art

Recently, a Machine-to-Machine (M2M) system has been introduced. An M2M communication refers to a communication executed between machines without human intervention. M2M may refer to Machine Type Communication (MTC), Internet of Things (IoT) or Device-to-Device (D2D). In the following description, the term "M2M" is uniformly used for convenience of explanation, but the present disclosure is not limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information.

In addition, an M2M terminal may be applied to various systems such as object tracking, automobile linkage, and power metering. Meanwhile, with respect to an M2M terminal, the oneM2M standardization organization provides requirements for M2M communication, things to things communication and IoT technology, and technologies for architecture, Application Program Interface (API) specifications, security solutions and interoperability. The specifications of the oneM2M standardization organization provide a framework to support a variety of applications and services such as smart cities, smart grids, connected cars, home automation, security, and health.

SUMMARY

The present disclosure provides a method and device processing a request message in a machine-to-machine (M2M) system.

According to the present disclosure, a message processing method performed by a machine-to-machine (M2M) apparatus in an M2M system includes steps of: generating a request message to be transmitted to M2M entity, transmitting the generated request message to the M2M entity, receiving a response message for the request message from the M2M entity, wherein the request message, as a request for a scheduling resource, requests a reservation for the M2M entity or requests a periodic notification.

According to the present disclosure, a message processing method performed by an M2M apparatus in an M2M system includes steps of: generating a multiplicity of request messages to be transmitted to M2M entity, transmitting the generated multiplicity of request messages to the M2M entity and receiving a response message for the request messages from the M2M entity, wherein the multiplicity of request messages based on a same content requests resource generation to the M2M entity.

According to the present disclosure, an M2M apparatus in an M2M system includes: a communication unit capable of transmitting and receiving a signal, and a processor capable of controlling the communication unit, wherein the processor generates a request message to be transmitted to M2M entity, transmits the generated request message to the M2M entity, and receives a response message for the request message from the M2M entity, and wherein the request message, as a request for a scheduling resource, requests a reservation for the M2M entity or requests a periodic notification.

BRIEF DESCRIPTION OF THE DRAWINGS

These and/or other aspects of the disclosure will become apparent and more readily appreciated from the following description of the exemplary embodiments, taken in conjunction with the accompanying drawings of which:

FIG. 8 is a view showing an attribute for setting a reservation based on a scheduling resource in an M2M system according to the present disclosure.

FIG. 9 is a view showing a process of setting periodic notification using a scheduling resource in an M2M system according to the present disclosure.

FIG. 10 is a view showing an attribute for setting periodic notification using a scheduling resource in an M2M system according to the present disclosure.

FIG. 13 is a view showing an attribute related to processing an identical content in an M2M system according to the present disclosure.

FIG. 14 is a view showing a process where a request message is transmitted by an M2M apparatus in an M2M system according to the present disclosure.

DETAILED DESCRIPTION OF THE DISCLOSURE

Figure 1:
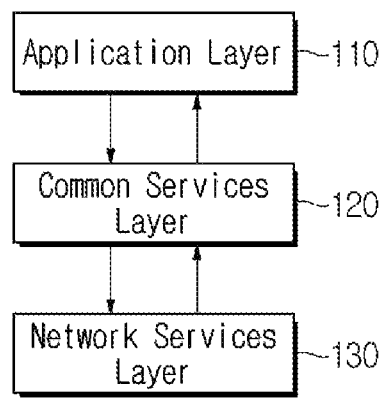
FIG. 1 is a view illustrating a layered structure of a Machine-to-Machine (M2M) system according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings, which will be easily implemented by those skilled in the art. However, the present disclosure may be embodied in many different forms and is not limited to the exemplary embodiments described herein.

In the present disclosure, the terms first, second, etc. are used only for the purpose of distinguishing one component from another, and do not limit the order or importance of components, etc. unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various exemplary embodiments are not necessarily essential components, and some may be optional components. Accordingly, embodiments consisting of a subset of the components described in one embodiment are also included within the scope of the present disclosure. Also, exemplary embodiments that include other components in addition to the components described in the various embodiments are also included in the scope of the present disclosure.

In the following description of the exemplary embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

In addition, the present specification describes a network based on Machine-to-Machine (M2M) communication, and a task in M2M communication network may be performed in a process of network control and data transmission in a system managing the communication network.

In the present specification, an M2M terminal may be a terminal performing M2M communication. However, in consideration of backward compatibility, it may be a terminal operating in a wireless communication system. In other words, an M2M terminal may refer to a terminal operating based on M2M communication network but is not limited thereto. An M2M terminal may operate based on another wireless communication network and is not limited to the exemplary embodiment described above.

In addition, an M2M terminal may be fixed or have mobility. The M2M server refers to a server for M2M communication and may be a fixed station or a mobile station.

In the present specification, an entity may refer to hardware such as the M2M device, M2M gateway and M2M server. For example, an entity may be used to refer to software configuration in a layered structure of M2M system and is not limited to the embodiment described above. In addition, for example, the present disclosure mainly describes an M2M system but is not solely applied thereto.

The M2M server may be configured to perform communication with an M2M terminal or another M2M server. In addition, an M2M gateway may be a connection point between an M2M terminal and an M2M server. For example, when an M2M terminal and an M2M server have different networks, the M2M terminal and the M2M server may be connected to each other via an M2M gateway. Herein, for example, both an M2M gateway and an M2M server may be M2M terminals and are not limited to the exemplary embodiment described above.

Further, in the present disclosure, storage may include a database. Sensitive data may be used to refer to private data and personal data. Additionally, in the present disclosure, M2M terminal may be used interchangeably with M2M apparatus and M2M device. A communication unit may be used interchangeably with a communication unit.

Additionally, oneM2M is a de facto standards organization that was founded to develop a communal IoT service platform sharing and integrating application service infrastructure (platform) environments beyond fragmented service platform development structures limited to separate industries like energy, transportation, national defense and public service.oneM2M aims to render requirements for things to things communication and IoT technology, architectures, Application Program Interface (API) specifications, security solutions and interoperability. For example, the specifications of oneM2M provide a framework to support a variety of applications and services such as smart cities, smart grids, connected vehicles, home automation, security and health. In this regard, oneM2M has developed a set of standards defining a single horizontal platform for data exchange and sharing among all the applications.

Applications across different industrial sections may also be considered by oneM2M. Similar to an operating system, oneM2M provides a framework connecting different technologies, thereby creating distributed software layers facilitating unification. Distributed software layers are implemented in a common services layer between M2M applications and communication Hardware/Software (HW/SW) rendering data transmission. For example, a common services layer may be a part of a layered structure illustrated in FIG. 1.

FIG. 1 is a view illustrating a layered structure of a Machine-to-Machine (M2M) system according to the present disclosure. Referring to FIG. 1, a layered structure of an M2M system may include an application layer 110, a common services layer 120 and a network services layer 130. Herein, the application layer 110 may be a layer that operates based on a specific application. For example, an application may be a fleet tracking application, a remote blood sugar monitoring application, a power metering application or a controlling application. In other words, an application layer may a layer for a specific application. Herein, an entity operating based on an application layer may be an application entity (AE).

The common services layer 120 may be a layer for a common service function (CSF). For example, the common services layer 120 may be a layer configured to provide common services like data management, device management, M2M service subscription management and location service. For example, an entity operating based on the common services layer 120 may be a common service entity (CSE). The common services layer 120 may be configured to provide a set of services that are grouped into CSFs according to functions. A multiplicity of instantiated CSFs constitutes CSEs. CSEs may interface with applications (e.g., application entities or AEs in the terminology of oneM2M), other CSEs and base networks (for example, network service entities or NSEs in the terminology of oneM2M).

The network services layer 130 may be configured to provide the common services layer 120 with services such as device management, location service, and device triggering. Herein, an entity operating based on the network layer 120 may be a network service entity (NSE).

Figure 2:
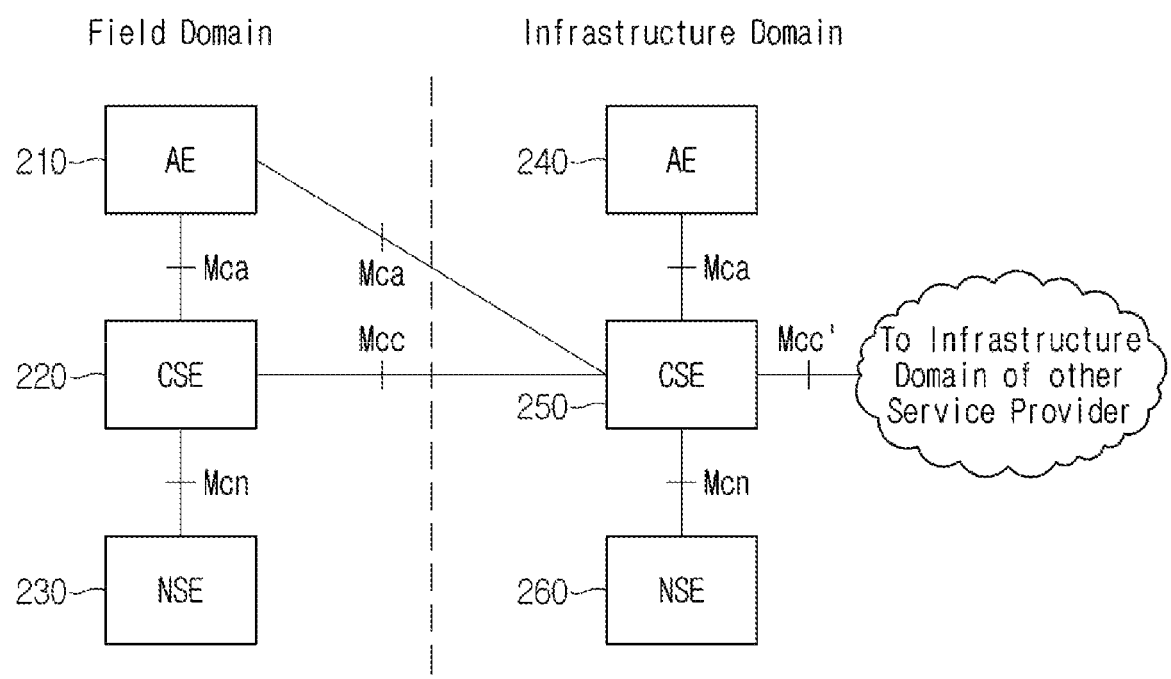
FIG. 2 is a view illustrating reference points in an M2M system according to the present disclosure.

FIG. 2 is a view illustrating reference points in an M2M system according to the present disclosure. Referring to FIG. 2, an M2M system structure may be distinguished into a field domain and an infrastructure domain. Herein, in each domain, each of the entities may be configured to perform communication via a reference point (e.g., Mca or Mcc). For example, a reference point may indicate a communication flow between each entity. In particular, referring to FIG. 2, the reference point Mca between AE 210 or 240 and CSE 220 or 250, the reference point Mcc between different CSEs and Mcn reference point between CSE 220 or 250 and NSE 230 or 260 may be set.

Figure 3:
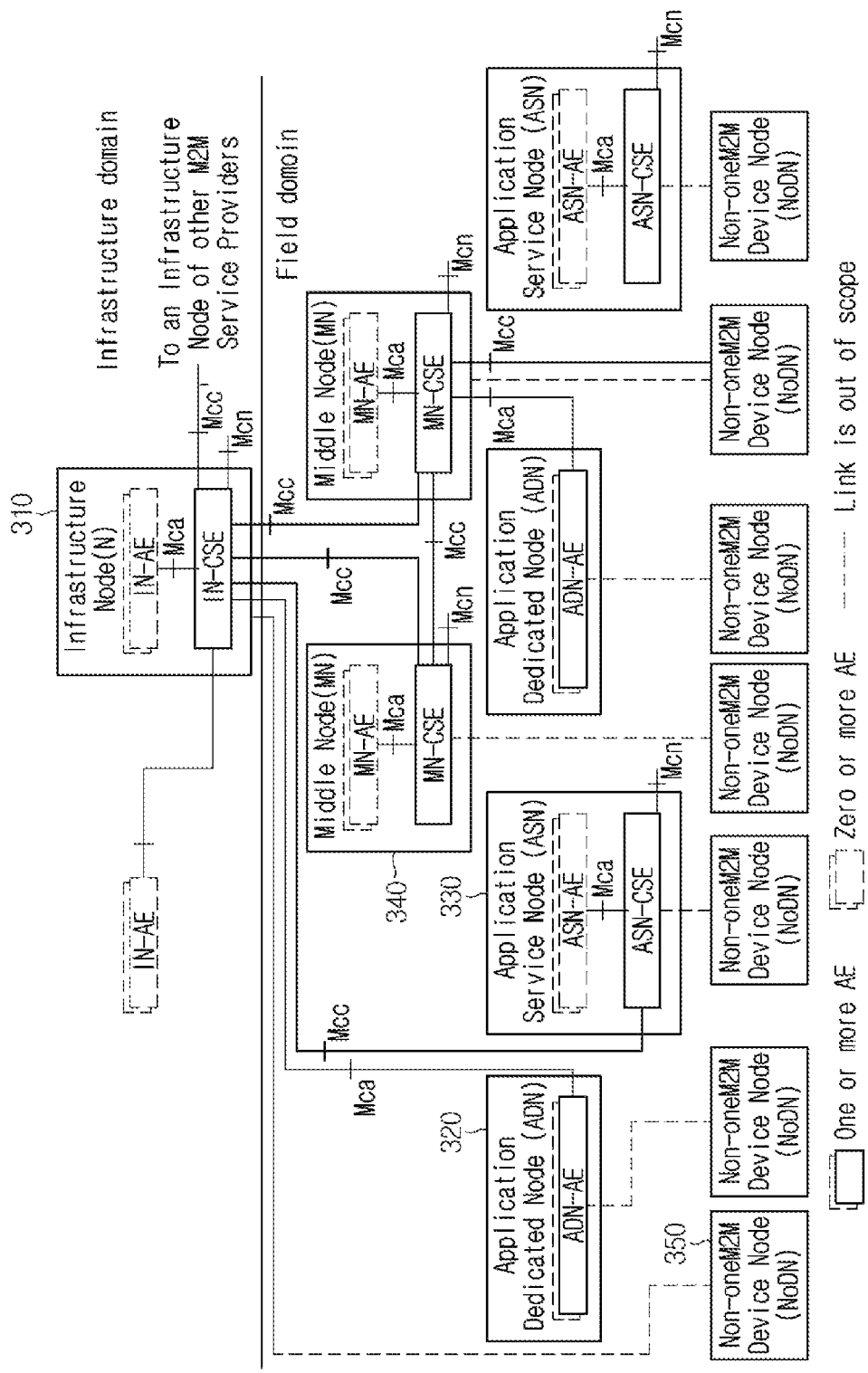
FIG. 3 is a view illustrating a common service function in an M2M system according to the present disclosure.

FIG. 3 is a view illustrating each node in an M2M system according to the present disclosure. Referring to FIG. 3, an infrastructure domain of a specific M2M service provider may be configured to provide a specific infrastructure node (IN) 310. Herein, the CSE of the IN may be configured to perform communication based on the AE and the reference point Mca of another infrastructure node. In particular, one IN may be set for each M2M service provider. In other words, the IN may be a node configured to perform communication with the M2M terminal of another infrastructure based on an infrastructure structure. In addition, for example, conceptually, a node may be a logical entity or a software configuration.

Furthermore, an application dedicated node (ADN) 320 may be a node including at least one AE but not CSE. Particularly, an ADN may be set in the field domain. In other words, an ADN may be a dedicated node for AE. For example, an ADN may be a node that is set in an M2M terminal in hardware. In addition, the application service node (ASN) 330 may be a node including one CSE and at least one AE. ASN may be set in the field domain. In other words, it may be a node including AE and CSE. In particular, an ASN may be a node connected to an IN. For example, an ASN may be a node that is set in an M2M terminal in hardware.

In addition, a middle node (MN) 340 may be a node including a CSE and including zero or more AEs. Particularly, the MN may be set in the field domain. An MN may be connected to another MN or IN based on a reference point. In addition, for example, an MN may be set in an M2M gateway in hardware. In addition, as an example, a non-M2M terminal node 350 (Non-M2M device node, NoDN) is a node that does not include M2M entities. It may be a node that performs management or collaboration together with an M2M system.

Figure 4:
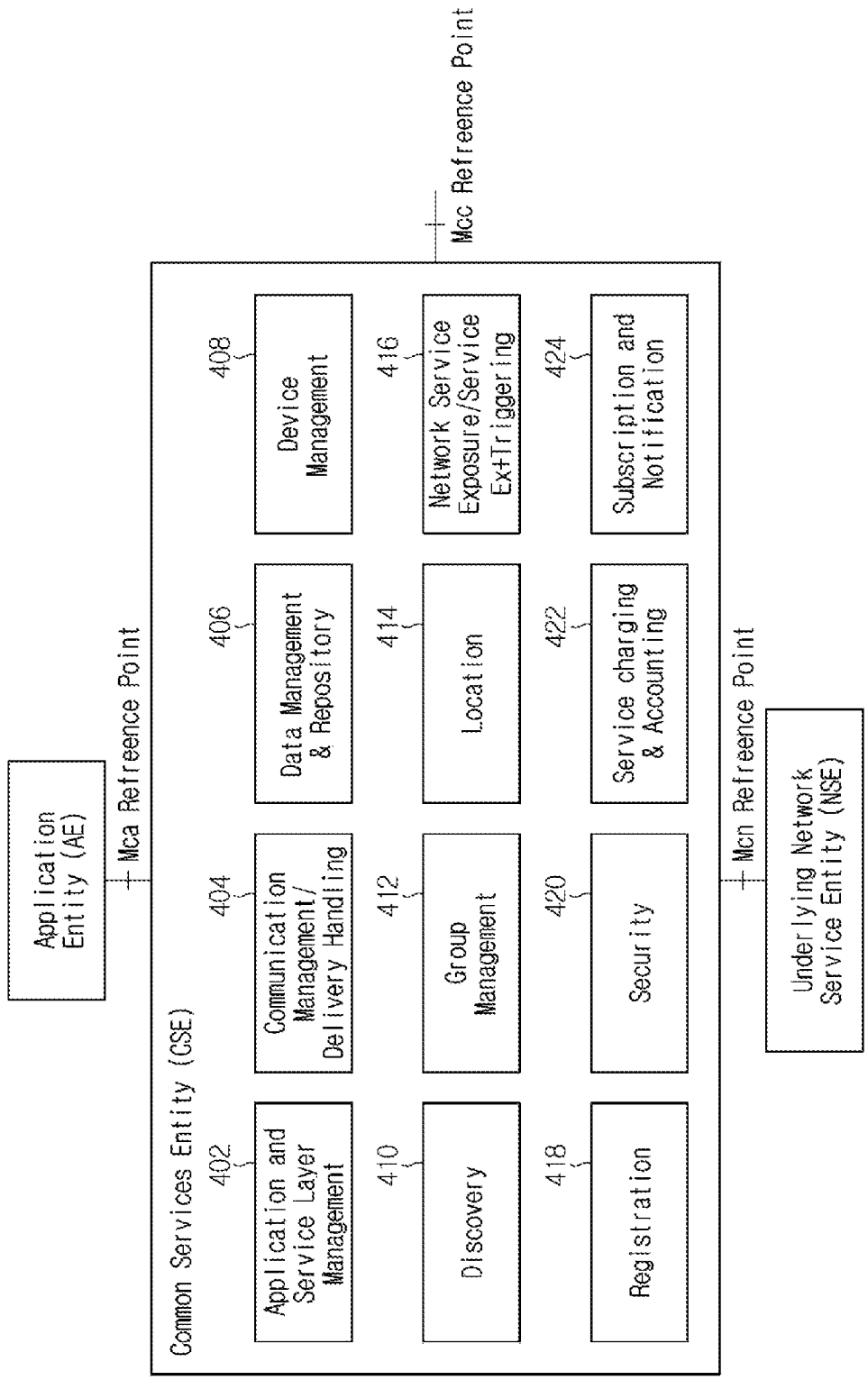
FIG. 4 is a view illustrating a common service function in an M2M system according to the present disclosure.

FIG. 4 is a view illustrating a common service function in an M2M system according to the present disclosure. Referring to FIG. 4, common service functions may be provided. For example, a common service entity may be configured to provide at least one or more CSFs among application and service layer management 402, communication management and delivery handling 404, data management and repository 406, device management 408, discovery 410, group management 412, location 414, network service exposure/service execution and triggering 416, registration 418, security 420, service charging and accounting 422, service session management and subscription/notification 424. At this time, M2M terminals may be configured to operate based on a common service function. In addition, a common service function may be possible in other exemplary embodiments and is not limited to the above-described exemplary embodiment.

The application and service layer management 402 CSF may be configured to provide management of AEs and CSEs. The application and service layer management 402 CSF may include the configuring, problem solving and upgrading of CSE functions and the capability of upgrading AEs. The communication management and delivery handling 404 CSF may be configured to provide communications with other CSEs, AEs and NSEs. The communication management and delivery handling 404 CSF may be configured to determine at what time and through what connection communications are to be delivered, and determine to buffer communication requests to thus deliver the communications delivered later, if necessary and permitted.

The data management and repository 406 CSF may be configured to provide data storage and transmission functions (e.g., data collection for aggregation, data reformatting, and data storage for analysis and sematic processing). The device management 408 CSF may be configured to provide the management of device capabilities in M2M gateways and M2M devices. The discovery 410 CSF may be configured to provide an information retrieval function for applications and services based on filter criteria.

The group management 412 CSF may be configured to provide processing of group-related requests. The group management 412 CSF enables an M2M system to support bulk operations for many devices and applications. The location 414 CSF may be configured to enable AEs to obtain geographical location information. The network service exposure/service execution and triggering 416 CSF may be configured to manage communications with base networks for access to network service functions.

The registration 418 CSF may be configured to register AEs (or other remote CSEs) to a CSE. The registration 418 CSF allows AEs (or remote CSE) to use services of CSE. The security 420 CSF may be configured to provide a service layer with security functions like access control including identification, authentication and permission. The service charging and accounting 422 CSF may be configured to provide charging functions for a service layer. The subscription/notification 424 CSF may be configured to provide a function of allowing subscription to an event and notifying the occurrence of the event.

Figure 5:
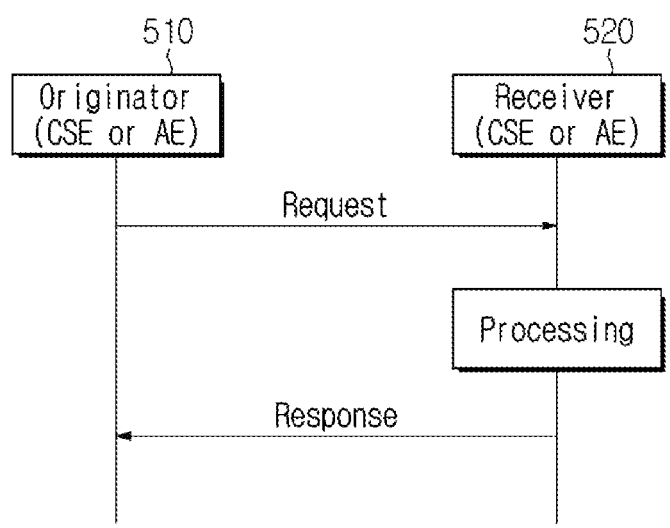
FIG. 5 is a view illustrating that an originator and a receiver exchange a message in an M2M system according to the present disclosure.

FIG. 5 is a view illustrating that an originator and a receiver exchange a message in an M2M system according to the present disclosure. Referring to FIG. 5, the originator 501 may be configured to transmit a request message to the receiver 520. In particular, the originator 510 and the receiver 520 may be the above-described M2M terminals. However, the originator 510 and the receiver 520 are not limited to M2M terminals but may be other terminals. They are not limited to the above-described exemplary embodiment. In addition, for example, the originator 510 and the receiver 520 may be nodes, entities, servers or gateways, which are described above. In other words, the originator 510 and the receiver 520 may be hardware or software configurations and are not limited to the above-described exemplary embodiment.

Additionally, a request message transmitted by the originator 510 may include at least one parameter. Herein, for example, a parameter may be a mandatory parameter or an optional parameter. For example, a parameter related to a transmission terminal, a parameter related to a receiving terminal, an identification parameter and an operation parameter may be mandatory parameters. In addition, optional parameters may be related to other types of information. In particular, a transmission terminal-related parameter may be a parameter for the originator 510. A receiving terminal-related parameter may be a parameter for the receiver 520. An identification parameter may be a parameter required for identification of each other.

An operation parameter may be a parameter for distinguishing operations. For example, an operation parameter may be set to any one among Create, Retrieve, Update, Delete and Notify. In other words, the parameter may aim to distinguish operations. Particularly, in response to receiving a request message from the originator 510, the receiver 520 may be configured to process the message. For example, the receiver 520 may be configured to perform an operation included in a request message. For the operation, the receiver 520 may be configured to determine whether a parameter is valid and authorized. In particular, if a parameter is valid and authorized, the receiver 520 may be configured to check whether there is a requested resource and may perform processing accordingly.

For example, when an event occurs, the originator 510 may be configured transmit a request message including a parameter for notification to the receiver 520. The receiver 520 may be configured to check a parameter for a notification included in a request message and perform an operation accordingly. The receiver 520 may be configured to transmit a response message to the originator 510.

A message exchange process using a request message and a response message, as illustrated in FIG. 5, may be performed between AE and CSE based on the reference point Mca or between CSEs based on the reference point Mcc. In other words, the originator 510 may be AE or CSE, and the receiver 520 may be AE or CSE. According to an operation in a request message, such a message exchange process as illustrated in FIG. 5 may be initiated by either AE or CSE.

A request from a requestor to a receiver through the reference points Mca and Mcc may include at least one mandatory parameter and at least one optional parameter. In other words, each defined parameter may be either mandatory or optional according to a requested operation. For example, a response message may include at least one parameter among those listed in Table 1 below.

TABLE 1

| Response message parameter/success or not |
|---|
| Response Status Code—successful, unsuccessful, ack |
| Request Identifier—uniquely identifies a Request message |
| Content—to be transferred |
| To—the identifier of the Originator or the Transit CSE that sent the corresponding non-blocking request |
| From—the identifier of the Receiver |
| Originating Timestamp—when the message was built |
| Result Expiration Timestamp—when the message expires |
| Event Category—what event category shall be used for the response message |
| Content Status |
| Content Offset |
| Token Request Information |
| Assigned Token Identifiers |
| Authorization Signature Request Information |
| Release Version Indicator—the oneM2M release version that this response message conforms to |

A filter criteria condition, which can be used in a request message or a response message, may be defined as in Table 2 and Table 3 below.

TABLE 2

| Condition tag | Multi-plicity | Description |
|---|---|---|
| | | Matching Conditions |
| createdBefore | 0 . . . 1 | The creationTime attribute of the matched resource is chronologically before the specified value. |
| createdAfter | 0 . . . 1 | The creationTime attribute of the matched resource is chronologically after the specified value. |
| modifiedSince | 0 . . . 1 | The lastModifiedTime attribute of the matched resource is chronologically after the specified value. |
| unmodifiedSince | 0 . . . 1 | The lastModifiedTime attribute of the matched resource is chronologically before the specified value. |
| stateTagSmaller | 0 . . . 1 | The stateTag attribute of the matched resource is smaller than the specified value. |
| stateTagBigger | 0 . . . 1 | The stateTag attribute of the matched resource is bigger than the specified value. |
| expireBefore | 0 . . . 1 | The expirationTime attribute of the matched resource is chronologically before the specified value. |
| expireAfter | 0 . . . 1 | The expirationTime attribute of the matched resource is chronologically after the specified value. |
| labels | 0 . . . 1 | The labels attribute of the matched resource matches the specified value. |
| labelsQuery | 0 . . . 1 | The value is an expression for the filtering of labels attribute of resource when it is of key-value pair format. The expression is about the relationship between label-key and label-value which may include equal to or not equal to, within or not within a specified set etc. For example, label-key equals to label value, or label-key within {label-value1, label-value2}. Details are defined in [3]. |
| childLabels | 0 . . . 1 | A child of the matched resource has labels attributes matching the specified value. The evaluation is the same as for the labels attribute above. Details are defined in [3]. |
| parentLabels | 0 . . . 1 | The parent of the matched resource has labels attributes matching the specified value. The evaluation is the same as for the labels attribute above. Details are defined in [3]. |
| resourceType | 0 . . . n | The resourceType attribute of the matched resource is the same as the specified value. It also allows differentiating between normal and announced resources. |
| childResourceType | 0 . . . n | A child of the matched resource has the resourceType attribute the same as the specified value. |
| parentResourceType | 0 . . . 1 | The parent of the matched resource has the resourceType attribute the same as the specified value. |
| sizeAbove | 0 . . . 1 | The contentSize attribute of the <contentInstance> matched resource is equal to or greater than the specified value. |
| sizeBelow | 0 . . . 1 | The contentSize attribute of the <contentInstance> matched resource is smaller than the specified value. |
| contentType | 0 . . . n | The contentInfo attribute of the <contentInstance> matched resource matches the specified value. |
| attribute | 0 . . . n | This is an attribute of resource types (clause 9.6). Therefore, a real tag name is variable and depends on its usage and the value of the attribute can have wild card *. E.g. creator of container resource type can be used as a filter criteria tag as "creator = Sam", "creator = Sam*", "creator = *Sam". |
| childAttribute | 0 . . . n | A child of the matched resource meets the condition provided. The evaluation of this condition is similar to the attribute matching condition above. |
| parentAttribute | 0 . . . n | The parent of the matched resource meets the condition provided. The evaluation of this condition is similar to the attribute matching condition above. |
| semanticsFilter | 0 . . . n | Both semantic resource discovery and semantic query use semanticsFilter to specify a query statement that shall be specified in the SPARQL query language [5]. When a CSE receives a RETRIEVE request including a semanticsFilter, and the Semantic Query Indicator parameter is also present in the request, the request shall be processed as a semantic query; otherwise, the request shall be processed as a semantic resource discovery.<br>In the case of semantic resource discovery targeting a specific resource, if the semantic description contained in the <semanticDescriptor> of a child resource matches the semanticFilter, the URI of this child resource will be included in the semantic resource discovery result. |

TABLE 2-continued

| Condition tag | Multiplicity | Description |
|---|---|---|
| | | In the case of semantic query, given a received semantic query request and its query scope, the SPARQL query statement shall be executed over aggregated semantic information collected from the semantic resource(s) in the query scope and the produced output will be the result of this semantic query. Examples for matching semantic filters in SPARQL to semantic descriptions can be found in [i.28]. |
| filterOperation | 0 . . . 1 | Indicates the logical operation (AND/OR) to be used for different condition tags. The default value is logical AND. |
| contentFilterSyntax | 0 . . . 1 | Indicates the Identifier for syntax to be applied for content-based discovery. |
| contentFilterQuery | 0 . . . 1 | The query string shall be specified when contentFilterSyntax parameter is present. |

TABLE 3

| Condition tag | Multiplicity | Description |
|---|---|---|
| | | Filter Handling Conditions |
| filterUsage | 0 . . . 1 | Indicates how the filter criteria is used. If provided, possible values are 'discovery' and 'IPEOnDemandDiscovery'. If this parameter is not provided, the Retrieve operation is a generic retrieve operation and the content of the child resources fitting the filter criteria is returned. If filterUsage is 'discovery', the Retrieve operation is for resource discovery (clause 10.2.6), i.e. only the addresses of the child resources are returned. If filterUsage is 'IPEOnDemandDiscovery', the other filter conditions are sent to the IPE as well as the discovery Originator ID. When the IPE successfully generates new resources matching with the conditions, then the resource address(es) shall be returned. This value shall only be valid for the Retrieve request targeting an <AE> resource that represents the IPE. |
| limit | 0 . . . 1 | The maximum number of resources to be included in the filtering result. This may be modified by the Hosting CSE. When it is modified, then the new value shall be smaller than the suggested value by the Originator. |
| level | 0 . . . 1 | The maximum level of resource tree that the Hosting CSE shall perform the operation starting from the target resource (i.e. To parameter). This shall only be applied for Retrieve operation. The level of the target resource itself is zero and the level of the direct children of the target is one. |
| offset | 0 . . . 1 | The number of direct child and descendant resources that a Hosting CSE shall skip over and not include within a Retrieve response when processing a Retrieve request to a targeted resource. |
| applyRelativePath | 0 . . . 1 | This attribute contains a resource tree relative path (e.g. ../tempContainer/LATEST). This condition applies after all the matching conditions have been used (i.e. a matching result has been obtained). The attribute determines the set of resource(s) in the final filtering result. The filtering result is computed by appending the relative path to the path(s) in the matching result. All resources whose Resource-IDs match that combined path(s) shall be returned in the filtering result. If the relative path does not represent a valid resource, the outcome is the same as if no match was found, i.e. there is no corresponding entry in the filtering result. |

A response to a request for accessing a resource through the reference points Mca and Mcc may include at least one mandatory parameter and at least one optional parameter. In other words, each defined parameter may be either mandatory or optional according to a requested operation or a mandatory response code. For example, a request message may include at least one parameter among those listed in Table 4 below.

TABLE 4

Request message parameter

| | |
|---|---|
| Mandatory | Operation - operation to be executed/CREAT, Retrieve, Update, Delete, Notify |
| | To - the address of the target resource on the target CSE |
| | From - the identifier of the message Originator |
| | Request Identifier - uniquely identifies a Request message |

TABLE 4-continued

Request message parameter

| | |
|---|---|
| Operation dependent Optional | Content - to be transferred<br>Resource Type - of resource to be created<br>Originating Timestamp - when the message was built<br>Request Expiration Timestamp - when the request message expires<br>Result Expiration Timestamp - when the result message expires<br>Operational Execution Time - the time when the specified operation is to be executed by the target CSE<br>Response Type - type of response that shall be sent to the Originator<br>Result Persistence - the duration for which the reference containing the responses is to persist<br>Result Content - the expected components of the result<br>Event Category - indicates how and when the system should deliver the message<br>Delivery Aggregation - aggregation of requests to the same target CSE is to be used<br>Group Request Identifier - Identifier added to the group request that is to be fanned out to each member of the group<br>Group Request Target Members-indicates subset of members of a group<br>Filter Criteria - conditions for filtered retrieve operation<br>Desired Identifier Result Type - format of resource identifiers returned<br>Token Request Indicator - indicating that the Originator may attempt Token Request procedure (for Dynamic Authorization) if initiated by the Receiver<br>Tokens - for use in dynamic authorization<br>Token IDs - for use in dynamic authorization<br>Role IDs - for use in role based access control<br>Local Token IDs - for use in dynamic authorization<br>Authorization Signature Indicator - for use in Authorization Relationship Mapping<br>Authorization Signature - for use in Authorization Relationship Mapping<br>Authorization Relationship Indicator - for use in Authorization Relationship Mapping<br>Semantic Query Indicator - for use in semantic queries<br>Release Version Indicator - the oneM2M release version that this request message conforms to.<br>Vendor Information |

A normal resource includes a complete set of representations of data forming the base of information to be managed. Unless qualified as either "virtual" or "announced", the resource types in the present document are normal resources. A virtual resource is used to trigger processing and/or a retrieve result. However, a virtual resource does not have a permanent representation in a CSE.

An announced resource contains a set of attributes of an original resource. When an original resource changes, an announced resource is automatically updated by the hosting CSE of the original resource. The announced resource contains a link to the original resource. Resource announcement enables resource discovery. An announced resource at a remote CSE may be used to generate a child resource at a remote CSE, which is not present as a child of an original resource or is not an announced child thereof.

To support resource announcement, an additional column in a resource template may specify attributes to be announced for inclusion in an associated announced resource type. For each announced <resourceType>, the addition of suffix "Annc" to the original <resourceType> may be used to indicate its associated announced resource type. For example, resource <containerAnnc> may indicate the announced resource type for <container> resource, and <groupAnnc> may indicate the announced resource type for <group> resource.

Resources may be specified in associated to CSE. Resources are representation of component and element in CSE at oneM2M system. Other CSEs, AEs, application data for sensor and commands are notified to CSE as an indication of resource representation. A resource is an entity that is uniquely addressable in oneM2M architecture. Resource is delivered and may be manipulated by CRUD (Create Retrieve Update Delete) operation.

A child resource is a sub-resource of the parent resource. The parent resource may include the reference to at least one child resource. An attribute may contain the information of resource. The set of attributes is not listed within the graphical representation of the resource, unless common to all resources. An attribute may be distinguished as universal attribute, common attribute and resource-specific attribute. The universal attribute is an attribute that appears on all resources. The common attribute is an attribute that appears on multiple resources and has the same meaning wherever it appears.

Table 5 may show the examples of the attributes that are virtual or not announced, general and universal on all resources.

TABLE 5

| Attribute Name | Description |
|---|---|
| resourceType | Resource Type. This Read Only (assigned at creation time. and then cannot be changed) attribute identifies the type of the resource as specified in clause 9.6. Each resource shall have a resourceType attribute. |

TABLE 5-continued

| Attribute Name | Description |
| --- | --- |
| resourceID | This attribute is an identifier for the resource that is used for 'non-hierarchical addressing method', i.e. this attribute shall contain the 'Unstructured-CSE-relative-Resource-ID' format of a resource ID as defined in table 7.2-1. This attribute shall be provided by the Hosting CSE when it accepts a resource creation procedure. The Hosting CSE shall assign a resourceID which is unique in that CSE. |
| resourceName | This attribute is the name for the resource that is used for 'hierarchical addressing method' to represent the parent-child relationships of resources. See clause 7.2 for more details. This attribute may be provided by the resource creator. The Hosting CSE shall use a provided resourceName as long as it does not already exist among child resources of the targeted parent resource. If the resourceName already exists, the Hosting CSE shall reject the request and return an error to the Originator. The Hosting CSE shall assign a resourceName if one is not provided by the resource creator. |
| parentID | This attribute is the resourceID of the parent of this resource. The value of this attribute shall be NULL for the <CSEBase> resource type. |
| creationTime | Time/date of creation of the resource. This attribute is mandatory for all resources and the value is assigned by the system at the time when the resource is locally created. Such an attribute cannot be changed. |
| lastModifiedTime | Last modification time/date of the resource. The lastModifiedTime value is set by the Hosting CSE when the resource is created, and the lastModifiedTime value is updated when the resource is updated. |

Table 6 shows examples of attributes that are commonly used in a plurality of resource types (but, not all resource types) that are virtual or not announced.

TABLE 6

| Attribute Name | Description |
| --- | --- |
| accessControlPolicyIDs | The attribute contains a list of identifiers for <accessControlPolicy> resources. The privileges defined in the <accessControlPolicy> resources that are referenced determine who is allowed to access the resource containing this attribute for a specific purpose (e.g. Retrieve, Update, Delete, etc.).<br>For an Update or Delete operation to a resource, the update or delete of the accessControlPolicyIDs attribute, if applicable, shall be performed prior to the update or delete of any other attributes of the resource.<br>To update this attribute, a Hosting CSE shall check whether an Originator has Update privilege in any selfPrivileges, regardless of privileges, of the <accessControlPolicy> resources which this attribute originally references.<br>After successful update of the accessControlPolicyIDs attribute, resource access checking for other attributes to be updated shall use the new privileges defined in the <accessControlPolicy> resource(s) that are referenced by the newly updated accessControlPolicyIDs attribute.<br>Similarly, to delete this attribute, a Hosting CSE shall check whether an Originator has Updateprivilege in any selfPrivileges, regardless of privileges, of the <accessControlPolicy> resources which this attribute originally references.<br>After successful deletion of the accessControlPolicyIDs attribute, resource access checking for other attributes to be deleted shall use the default access privileges as described in the following paragraphs.<br>If a resource type does not have an accessControlPolicyIDs attribute definition, then the accessControlPolicyIDs for that resource is governed in a different way, for example, the accessControlPolicy associated with the parent may apply to a child resource that does not have an accessControlPolicyIDs attribute definition, or the privileges for access are fixed by the system. Refer to the corresponding resource type definitions and procedures to see how access control is handled in such cases.<br>If a resource type does have an accessControlPolicyIDs attribute definition, but the (optional) accessControlPolicyIDs attribute value is not set in a resource instance, then the Hosting CSE shall apply the concept of the default access policy. The default policy shall provide unrestricted access only to the Originator of the successful resource creation request. All other entities shall be denied to access the resource. For that purpose, the Hosting CSE shall keep that Originator information of the resource. Note that how to keep that information is implementation specific. The default access policy is not applied to a resource which has a value assigned to the accessControlPolicyIDs attribute. |

TABLE 6-continued

| Attribute Name | Description |
| --- | --- |
|  | All resources are accessible if and only if the privileges (i.e. configured as privileges or selfPrivileges attribute of <accessControlPolicy> resource) allow it, therefore all resources shall have an associated accessControlPolicyIDs attribute, either explicitly (setting the attribute in the resource itself) or implicitly (either by using the parent privileges or the system default policies). Which means that the system shall provide default access privileges in case that the Originator does not provide a specific accessControlPolicyIDs during the creation of the resource. |
| expirationTime | Time/date after which the resource will be deleted by the Hosting CSE. This attribute can be provided by the Originator, and in such a case it will be regarded as a hint to the Hosting CSE on the lifetime of the resource. The Hosting CSE shall configure the expirationTime value. If the Hosting CSE configures the new expirationTime attribute value rather than the Originator suggested value, the new value can be sent back to the Originator depending on the Result Content value. The lifetime of the resource can be extended by providing a new value for this attribute in an UPDATE operation. Or by deleting the attribute value, e.g. by updating the attribute with NULL when doing a full UPDATE, in which case the Hosting CSE can decide on a new value.<br>If the Originator does not provide a value in the CREATE operation the system shall assign an appropriate value depending on its local policies and/or M2M service subscription agreements.<br>A resource is known as 'obsolete' when the resource contains the attribute "expirationTime" and the lifetime of this resource has reached the value of this attribute. If the 'obsolete' resource had a reference to an Application Entity Resource ID, the Hosting CSE shall send a NOTIFY request to the IN-CSE, requesting to delete the entry from the <AEContactList> resource. |
| stateTag | An incremental counter of modification on the resource. When a resource is created, this counter is set to 0, and it will be incremented on every modification of the resource (see notes 1 and 2). |
| announceTo | This attribute may be included in a CREATE or UPDATE Request in which case it contains a list of addresses/CSE-IDs where the resource is to be announced. For the case that CSE-IDs are provided, the announced-to CSE shall decide the location of the announced resources based on the rules described in clause 9.6.26. For the original resource, this attribute shall only be present if it has been successfully announced to other CSEs. This attribute maintains the list of the resource addresses to the successfully announced resources. Updates on this attribute will trigger new resource announcement or de-announcement.<br>If announceTo attribute includes resource address(es), the present document does not provide any means for validating these address(es) for announcement purposes. It is the responsibility of the Hosting-CSE referenced by the resource address(es) to validate the access privileges of the originator of the Request that triggers the announcement. |
| announcedAttribute | This attributes shall only be present at the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed. |
| labels | Tokens used to add meta-information to resources. This attribute is optional.<br>The value of the labels attribute is a list of individual labels, each of them being:<br>Either a standalone label-key, used as a simple "tag", that can be used for example for discovery purposes when looking for particular resources that one can "tag" using that label-key<br>Or a composite element made of a label-key and a label-value, separated by a special character defined in [3].<br>The list of allowed characters in a label (and in label-keys and label-values) and separator characters is defined in [3], clause 6.3.3. |
| e2eSecInfo | Present in a resource representing an AE or CSE. Indicates the end-to-end security capabilities supported by the AE or CSE. May indicate supported end-to-end security frameworks. May also contains a certificate or credential identifier used by the AE or CSE. May include random values for use in end-to-end security protocols. The details of this attributes are described in oneM2M TS-0003 [2]. This attribute is optional and if not present it means that the represented entity does not support oneM2M end-to-end security procedures. |
| DynamicAuthorization ConsultationIDs | This attribute contains a list of identifiers of <dynamicAuthorizationConsultation> resources. The information defined in a <dynamicAuthorizationConsultation> resource is used by a CSE for initiating consultation-based dynamic authorization requests. Consultation-based dynamic authorization is only performed for a targeted resource if and only if it is linked to an enabled <dynamicAuthorizationConsultation> resource. |

TABLE 6-continued

| Attribute Name | Description |
| --- | --- |
|  | If the attribute is not set or has a value that does not correspond to a valid <dynamicAuthorizationConsultation> resource(s), or it refers to an <dynamicAuthorizationConsultation> resource(s) that is not reachable, then the dynamicAuthorizationConsultationIDs associated with the parent may apply to the child resource if present, or a system default <dynamicAuthorizationConsultation> may apply if present. |

Meanwhile, in an M2M system (for example, oneM2M), an entity interested in a change of a resource may subscribe to the resource to receive a notification of the change. In this case, a resource for subscription should be set to subscribe to the notification. A resource for subscription may be referred to as a subscription resource or a <subscription> resource. When a subscription resource is generated/set, a device (or entity), to which the subscription resource is set, may transmit a notification to an address set to the subscription resource, when a change/modification satisfying a condition set to the subscription resource occurs to a subscribed-to resource (subscribed resource). A device (or entity) to which a subscription resource is set and/or which includes a subscribed-to resource is referred to as a hosting device (or hosting entity). For example, a subscribed-to resource may exist in a CSE of an M2M gateway. In this case, the M2M gateway may be referred to as a hosting device, and the CSE of the M2M gateway may be referred to as a hosting CSE.

A subscription procedure may be performed using a subscription resource in a resource-oriented manner. For example, a subscription resource may be generated to subscribe to a specific subscribed-to resource, a condition for subscription may be changed by modifying a subscription resource, and a subscription resource may be deleted when subscription is not needed anymore.

A subscription resource includes information on a subscribed-to resource. A relation between a subscribed-to resource and a subscription resource may be represented as a parent-child relation. For example, a <container> resource including a subscribed-to resource may have a <subscription> resource as a child resource. When a parent subscribed-to resource is deleted, the <subscription> resource may be deleted.

When a subscription resource is a child resource, a notification for indicating a status change of a parent resource may be delivered to an entity specified in address information (e.g., a notificationURI or contact attribute) in the subscription resource according to configuration (or attribute configuration) of the subscription resource. When an originator has a RETRIEVE (or READ) permission for a subscribable resource, the originator may generate a subscription resource. An originator of the subscription resource becomes a resource subscriber. When there is a modification to a subscribed-to resource, the modification may be compared with a specific attribute (e.g., notificationCriteria attribute) and thus it may be determined whether to transmit a notification to the resource subscriber.

A subscription resource (e.g., <subscription> resource) may have various attributes and child resources. For example, a subscription resource (e.g., <subscription> resource) may have attributes shown in Table 1. In Table 1, R/W indicates permission to read/write a corresponding attribute and may be one of READ/WRITE (RW), READ ONLY (RO), and WRITE ONLY (WO). <Table 7> is just an example. An attribute of a subscription resource may be configured differently from <Table 7>.

TABLE 7

| Attribute Name | Description |
| --- | --- |
| resourceType | Resource Type. |
| resourceID | This attribute is an identifier for resource that is used for 'non-hierarchical URI method' or 'IDs based method' cases. |
| parentID | The system shall assign the value to this attribute according to the parameters given in the CREATE Request. |
| expirationTime | Time/date after which the resource will be deleted by the hosting CSE. This attribute can be provided by the issuer, and in such a case it will be regarded as a hint to the hosting CSE on the lifetime of the resource. |
| creationTime | Time/date of creation of the resource. |
| lastModifiedTime | Last modification time/date of the resource. |
| accessControlPolicyIDs | The attribute contains a list of identifiers (either an ID or a URI depending if it is a local resource or not) of an <accessControlPolicy> resource. The privileges defined in the <accessControlPolicy> resource that are referenced determine who is allowed to access the resource containing this attribute for a specific purpose (e.g., Retrieve, Update, Delete, etc). |
| notificationCriteria | When notification events happen on the subscribed-to resource, the list of notification events that match the notification criteria shall be sent as a Notify request. |
| expirationCounter | When the number of notifications becomes the same as this counter, the <subscription> resource shall be deleted. |
| notificationURI | List of URI(s) where the resource subscriber will receive notifications. This list of URI(s) may not represent the resource subscriber entity. |
| aggregationURI | URI to aggregate notifications from group members of a <group> resource. |
| batchNotify | Indicates that notifications should be batched for delivery. When set, notification events are temporarily stored until either a specified number is ready to send or until a duration after the first notification event has expired. |
| rateLimit | Indicates that notifications should be rate-limited. When set, notification events that exceed a specified number within a specified time are temporarily stored then sent when the number of events sent per specified time falls below the limit. |
| priorSubscriptionNotify | Indicates that when this subscription is created, whether notification events prior to subscription should be sent, e.g. send prior "n" notifications, if available. |
| notificationStoragePriority | Indicates a priority for this subscription relative to other subscriptions belonging to this same subscriber for retention of notification events when storage is congested. |
| notificationStructure | Type of information that shall be contained in notifications. E.g., modified attribute only of a subscribed-to resource, a whole subscribed-to resource, and/or URI of a corresponding <subscription> resource. |

TABLE 7-continued

| Attribute Name | Description |
| --- | --- |
| subscriberURI | URI that the <subscription> created entity can get notification from the <subscription> hosting CSE. <subscription> deletion shall be notified if this URI is provided. |

In addition, a subscription resource (e.g., <subscription> resource) may have a scheduling resource (e.g., <schedule> resource) that contains scheduling information as a child resource. When a scheduling resource is set as a child resource of a specific resource, the scheduling resource represents scheduling information in the context of its parent resource. A scheduling resource (e.g., <schedule>) defines reachability schedule information for a corresponding node. When a scheduling resource is instantiated as a child resource of a subscription resource, it may be referred to as a notification scheduling resource (e.g., notificationSchedule resource). A scheduling resource or a notification scheduling resource (e.g., a <schedule> or a notificationSchedule resource) may be referred to herein as a scheduling resource. For example, when a scheduling resource is a child resource of a subscription resource, the scheduling information set in the scheduling resource may indicate scheduling information for notification of the subscription resource. Herein, the scheduling information may be referred to as reachability schedule information.

In this specification, the term "reachable" may refer to a state in which messages are capable of being transmitted and received between nodes, and the term "unreachable" or "non-reachable" may refer to a state in which no message is capable of being transmitted and received between nodes. Also, when a specific node is in a reachable state, it may be referred to as being in a reachable mode. Also, when a specific node is in an unreachable state, it may be referred to as being in an unreachable mode. Accordingly, reachability schedule information may indicate a time where message transmission/reception may occur between nodes. Also, the connection state between the nodes may be referred to as reachability.

A scheduling resource (e.g., <schedule>) may have various attributes. For example, a scheduling resource may include attributes such as resource Type, resourceID, parentID, expirationTime, creationTime, and lastModifiedTime (see Table 3). In Table 3, RW/RO/WO indicates permission to read/write a corresponding attribute and may be one of READ/WRITE (RW), READ ONLY (RO), and WRITE ONLY (WO). In addition, the multiplicity in Table 3 indicates the number of times that a corresponding attribute may occur in the <schedule> resource. <Table 8> is only an example. An attribute of a scheduling resource may be configured differently from <Table 8>.

TABLE 8

| Attributes | Multi-plicity | RW/RO/WO | Description |
| --- | --- | --- | --- |
| resourceType | 1 | RO | Resource Type |
| resourceID | 1 | WO | This attribute is an identifier for resource that is used for 'non-hierarchical URI method' or 'IDs based method' cases. This attribute shall be provided by the Hosting CSE when it accepts a resource creation procedure. The Hosting CSE shall assign a resourceID which is unique in the CSE |
| parentID | 1 | RO | The system shall assign the value to this attribute according to the parameters given in the CREATE Request. |
| expirationTime | 1 | RW | Time/date after which the resource will be deleted by the hosting CSE. This attribute can be provided by the Originator, and in such a case it will be regarded as a hint to the hosting CSE on the lifetime of the resource. |
| creationTime | 1 | RO | Time/date of creation of the resource. |
| lastModifiedTime | 1 | RO | Last modification time/date of the resource. |
| labels | 0 . . . 1 | RO | The attribute contains a list of identifiers (either an ID or a URI depending if it is a local resource or not) of an <accessControlPolicy> resource. The privileges defined in the <accessControlPolicy> resource that are referenced determine who is allowed to access the resource containing this attribute for a specific purpose (e.g. Retrieve, Update, Delete, etc.) |
| announceTo | 0 . . . 1 | RW | This attribute may be included in a CREATE or UPDATE Request in which case it contains a list of URIs/CSE-IDs which the resource being created/updated shall be announced to. |
| announcedAttribute | 1 | RW | This attribute shall only be present on the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if |

TABLE 8-continued

| Attributes | Multi-plicity | RW/RO/WO | Description |
|---|---|---|---|
| | | | the existing attribute is removed. |
| scheduleElement | 1 (L) | RW | Expresses time periods defined by second, minute, hour, day of month, month, year. Supports repeating periods, and wildcard expressed as a list. |
| networkCoordinated | 0 . . . 1 | RW | Indicates if IN-CSE shall perform schedule coordination with an Underlying Network. This attribute is only applicable when <schedule> is a child resource of <node>. The supported values are: NOTE: The schedule coordination is also subject to IN-CSE local policy. False: The IN-CSE may not perform schedule coordination. True: The IN-CSE shall perform schedule coordination. |

In addition, for example, a scheduling resource may include an attribute (e.g., scheduleElement) for scheduling time information. An attribute for scheduling time information may represent time defined in seconds, minutes, hours, days, months, years, etc. It may represent a repetition of time and be expressed as a wildcard (e.g., '*'). An attribute for scheduling time information may indicate a time period in which a specific node is in reachable mode or a time period in which a specific node is in an unreachable mode. For example, when an attribute for scheduling time information indicates a time period in which a specific node is in a reachable mode, the node may transmit and receive a message during the time period specified in the attribute for scheduling time information and be linked with other nodes. As another example, when an attribute for scheduling time information indicates a time period in which a specific node is in an unreachable mode, the node may be incapable of transmitting and receiving a message during the time period specified in the attribute for scheduling time information and not be linked with other nodes.

Meanwhile, the function, role and usage of a scheduling resource may be different according to an associated resource type. For example, when a scheduling resource corresponds to a child resource of a <node> resource, it may indicate a time period where communication through an underlying network is enabled. Herein, when various underlying networks are provided, a maximum of one scheduling resource may exist in each underlying network. A single scheduling resource may be used for a multiplicity of underlying networks.

In addition, the <mgmtLink> attribute of <cmdhNwAccessRule>, which is a child resource of a <node> resource, may be linked with a child resource <schedule>. When a scheduling resource is a child resource of a resource <CSEBase>, a time may be indicated where CSE is expected to perform processing. Meanwhile, when a notification is capable of being transmitted to a notification target, a scheduling resource, which is a child resource of a subscription resource, may indicate a time period.

Meanwhile, since a scheduling resource is capable of providing information for time where a CSE alone is currently available for processing, that is, time where the CSE does not perform any other processing (CSE availability time), if a conflict occurs between CSE request messages, only a first arrived request message is processable, which is inefficient. In order to solve this problem, the present disclosure proposes a message processing method and apparatus based on a CSE reservation function in an M2M system. The method and apparatus proposed herein will be described below with reference to FIGS. 6 to 8 and FIGS. 14 to 17.

In addition, when creating a subscription resource and a scheduling resource for a current periodic notification, a first notification may be generated randomly with respect to time. In order to solve this problem, the present disclosure proposes a method and apparatus for processing a periodic notification request message in an M2M system. The method and apparatus proposed herein will be described below with reference to FIGS. 9 to 10 and FIGS. 14 to 17.

Meanwhile, when an M2M request or response request includes an excessive request or response parameter, it may result in worsening message transmission delay and increasing of message overhead. Furthermore, while the M2M communication, there may be some messages that include identical content and an identical parameter repeatedly, or data capable of being compressed. Nevertheless, an M2M service layer does not support a compression mechanism, and a header compression protocol based on an M2M service layer is unavailable among pre-existing compression protocols of a header. Therefore, there is no appropriate header protocol based on M2M service layer. For example, IETF 3095, which is a robust header compression protocol, is one of the header compression protocols that are applicable to a network layer, a transport layer, and an application protocol layer. Other well-known header compression protocols are not directly based on an M2M service layer. Accordingly, the present disclosure proposes a request message processing method and apparatus when the request message includes an identical content based on an M2M service layer in an M2M system. The method and apparatus proposed herein will be described in detail below with reference to FIGS. 11 to 17.

Figure 6:
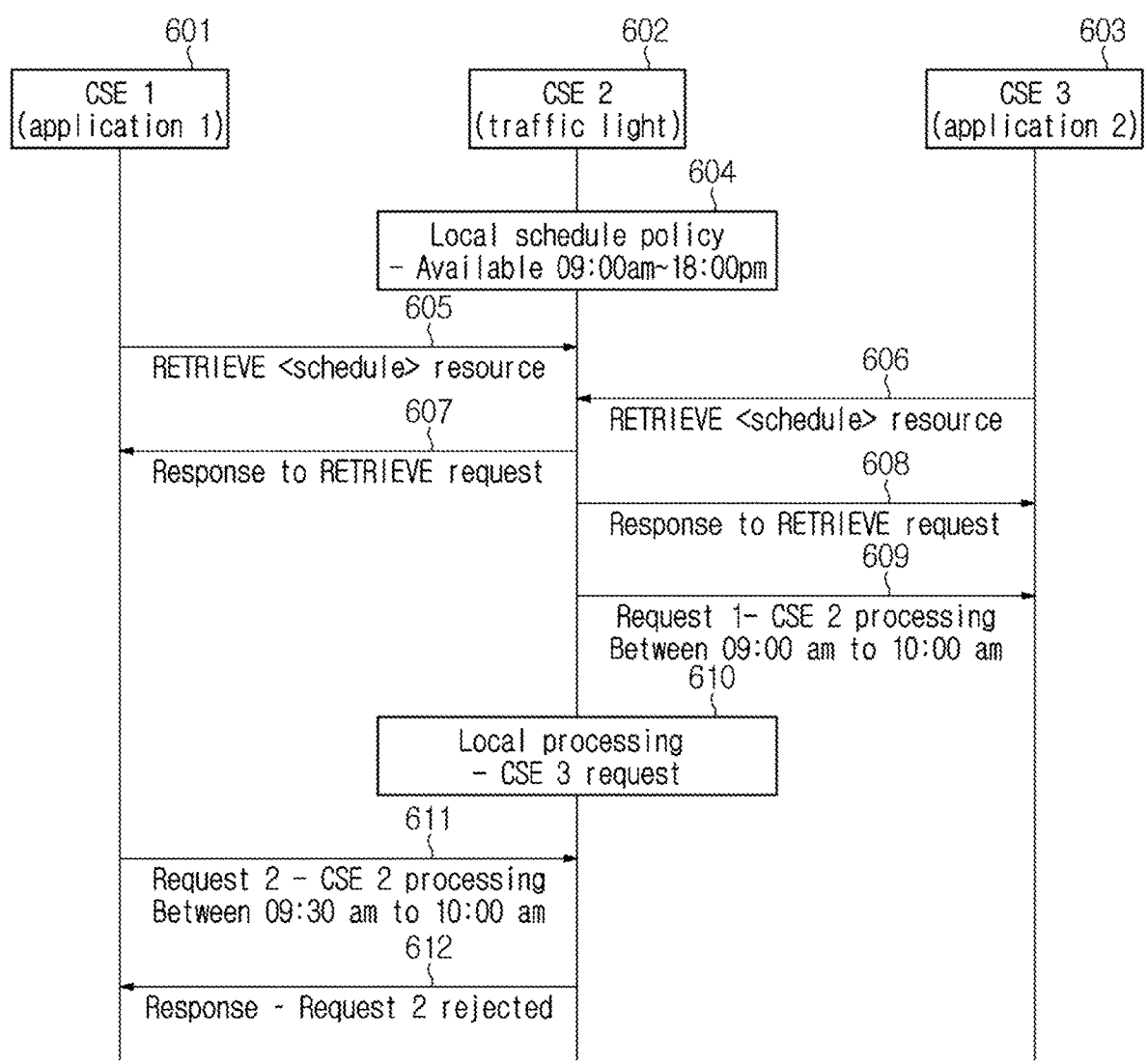
FIG. 6 is a view showing a process where a request message for a scheduling resource is processed in an M2M system according to the present disclosure.

FIG. 6 is a view showing a process where a request message related to a scheduling resource is processed in an M2M system according to the present disclosure. More particularly, FIG. 6 is a view showing a process where competition between request messages occurs since a limited function of a scheduling resource is provided.

In one embodiment, an M2M system may include CSE 1 601, CSE 2 602, and CSE 3 603. For example, CSE 1 may correspond to an M2M apparatus implementing the application 1. CSE 1 is assumed to correspond to the police station side, and CSE 2 is assumed to correspond to a traffic light on the street. For example, CSE 3 is assumed to correspond to an M2M apparatus implementing the application 2.

Meanwhile, CSE 1, CSE 2, and CSE 3 may be M2M entities and be referred to as M2M apparatuses below, for convenience, but are not limited thereto.

First of all, as CSE 2 corresponds to a traffic light on the street, it may implement a series of services (604) according to a local scheduling policy. For example, a local scheduling policy may be applied to CSE 2 for a certain time (e.g., from 9 AM to 6 PM). In one embodiment, for confirming time when a local scheduling policy of CSE 2 is possible, CSE 1 may transmit a scheduling resource retrieval request message 605 to CSE 2. Meanwhile, immediately after CSE 1 transmits the retrieval request message 605 to CSE 2, CSE 3 may transmit a scheduling resource retrieval request message 606 to CSE 2. In one embodiment, the scheduling resource herein may be a <schedule> resource. Then, CSE 2 may transmit (607, 608) a response message including local scheduling availability time of CSE 2 for the retrieval request messages of CSE 1 and CSE 3 respectively.

Then, CSE 3 may transmit (609) a request message for processing of CSE 2 to CSE 2. For example, this request message may require that CSE 2 implement a series of processing, that is, services for a certain time (e.g., from 9 AM to 10 PM). When receiving the message, CSE 2 may perform local processing 601 according to the request message of CSE 3. Herein, CSE 1 may transmit a request message 611 requiring a series of processing, that is, service implementation to CSE 2. Herein, the request message may include content requiring service implementation for a certain time to CSE 2 and partially overlap with the above-mentioned request message 609, which is transmitted from CSE 3 to CSE 2, in time for service implementation. For example, the request message 611 transmitted by CSE 1 to CSE 2 may require that local processing is performed from 9:30 AM to 10 AM. Thus, CSE 2 may transmit a response message 612 indicating that the service implementation of the request message 611 transmitted by CSE 1 has been rejected.

In this case, since CSE 1 may not know when the local processing of CSE 2 for another CSE is completed, CSE 1 may transmit a request message again after receiving the response message 612. In this case, the request message of CSE 1 may be rejected again. Accordingly, local processing for CSE 1 may be placed in very low priority, and retransmitting the request message may cause a problem of inefficiency in time and resource.

Thus, a request message handling process for solving the problem in an M2M system will be described with reference to FIG. 7.

Figure 7:
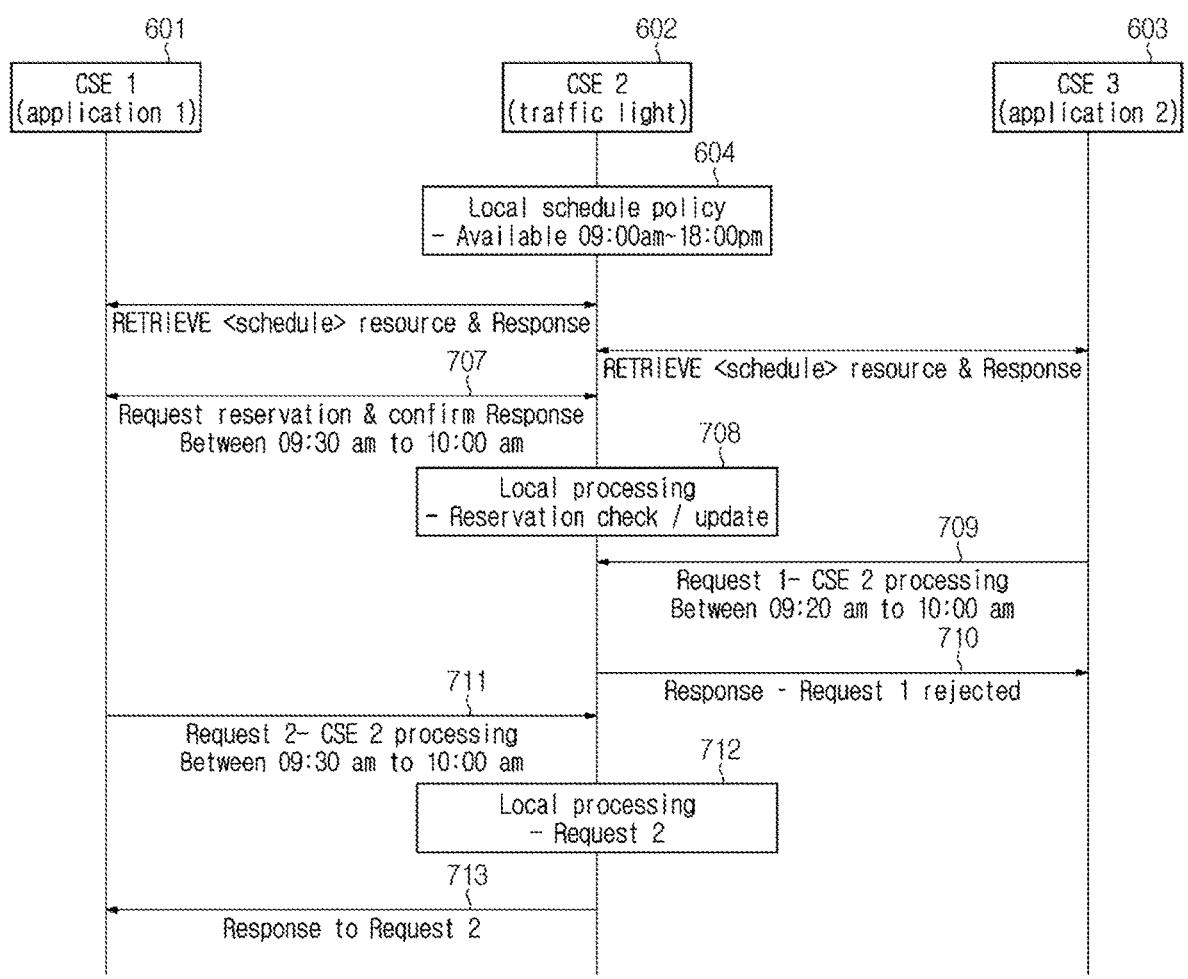
FIG. 7 is a view showing a process of setting a reservation based on a scheduling resource in an M2M system according to the present disclosure.

FIG. 7 is a view showing a process of setting a reservation based on a scheduling resource in an M2M system according to the present disclosure.

In one embodiment, the M2M system of FIG. 7 may be identical with the M2M system of FIG. 6. In other words, the description is based on the same CSE 1, CSE 2 and CSE 3. Also, both transmission and reception of a scheduling resource retrieval request message and those of corresponding response messages before request messages are transmitted by CSE 1 and CSE 3 to CSE 2 may be identical.

As mentioned above, CSE 1, CSE 2, and CSE 3 may be M2M entities and be referred to as M2M apparatuses below, for convenience, but are not limited thereto.

In one embodiment, after performing communication based on a scheduling resource retrieval request message with CSE 2, CSE 1 may recognize local processing availability time of CSE 2 (e.g., from 9 AM to 6 PM). Thus, CSE 1 may transmit a request message 707 regarding local processing (service implementation) by designating a certain time within the local processing availability time of CSE 2. Herein, the request message 707 may require local processing time of CSE 2 (e.g., reservation time from 9:30 AM to 10 AM) to be set. In other words, reservation time and reservation state including reservation content may be included. CSE 2 receiving the message of CSE 1 may accept it when there is no other CSE that has already requested local processing for the same time. This may be done based on the reservation check and update of CSE 2. The reservation check and update may be based on an attribute of a scheduling resource. The attribute will be described in further detail with reference to FIG. 8. According to reservation check and update, CSE 2 may be set to implement a request of CSE 1 for the reservation time.

Herein, CSE 3 may transmit a request message 709 to CSE 2 requiring a local processing time that partially overlaps with the time requested by CSE 1. For example, the request message 709 of CSE 3 may require local processing from 9:20 AM to 10 AM to CSE 2. In this case, since CSE 2 receives the request message of CSE 1 first, CSE 2 may transmit a response message 710 to the effect that the request of CSE 3 is rejected because the local processing requested by CSE 1 will be implemented during the time.

Then, when CSE 1 transmits a local processing request message at the time reserved through the request message 707, CSE 2 may perform local processing 712 for implementing a service requested by CSE 1. Then, when the local processing 712 is completed, CSE 2 may transmit a response message 713 to notify the completion of the local processing 712 to CSE 1.

Meanwhile, although not illustrated in FIG. 7, after receiving a response message indicating that its message is rejected, CSE 3 may generate a request message again and transmit it to CSE 2. In this case, the regenerated request message may include a reservation time that does not overlap with a reservation time of the previous message that is rejected.

Meanwhile, the above description is also related to FIGS. 14 to 16, which will be described in further detail below.

FIG. 8 is a view showing an attribute for setting a reservation based on a scheduling resource in an M2M system according to the present disclosure. More particularly, FIG. 8 is a view showing an attribute for local processing reservation of CSE, which may be included in a scheduling resource.

In one embodiment, the scheduling resource including an attribute in FIG. 8 may be a <schedule> resource. First, an attribute <scheduleElement> 801 may comprise seven fields of second, minute, hour, day of month, month, day of week and year and be used to indicate scheduling information with respect to time.

In one embodiment, an attribute <reservationElement> 802 may indicate information on reservation time, that is, duration of a reservation request message. Reservation time may mean duration to be reserved for local processing. In addition, the attribute 802 may be automatically deleted when the reservation request is confirmed in an attribute <reservationStatus> below. In another embodiment, when reservation duration ends, that is, when local processing is completed at a reservation time, the attribute 802 may also be deleted according to a change in the reservation status of the attribute <reservationStatus>.

In one embodiment, an attribute <reservationStatus> 803 may indicate a reservation content and a reservation status.

Meanwhile, as the name of the above-mentioned attribute is merely one embodiment, it may be set differently. Other things than the above-mentioned contents may be indicated.

FIG. 9 is a view showing a process of setting periodic notification using a scheduling resource in an M2M system according to the present disclosure. More particularly, (a) in FIG. 9 represents a problematic case where a first notification is made randomly with respect to time after a periodic notification is set, and (b) in FIG. 9 represents a process for solving a problematic case like the one described by (a) in FIG. 9.

Scheduling resources for periodic notification of FIG. 9 may be generally used to indicate scheduling information. Herein, a <schedule> resource, which is one example of the scheduling resources, may provide different functions according to a type of a relevant resource. For example, when the <schedule> resource is a child resource of a <node> resource, it may indicate a time period for communication with a node through an underlying network. In one embodiment, when there is a multiplicity of underlying networks, a maximum of one <schedule> resource may exist for each underlying network. In other words, one <schedule> resource may be used for a multiplicity of underlying networks. Meanwhile, an attribute <mgmtLink> of <cmdhNwAccessRule>, which is a child resource of a <node> resource, may be linked with a <schedule> resource. In this case, the <schedule> resource may be a child resource of the <node> resource.

In one embodiment, when a <schedule> resource is a child resource of a <CSEBase> resource, the <schedule> resource may indicate an expected time where a CSE is capable of implementing and processing a series of services, that is, of performing local processing.

In another embodiment, when a scheduling resource (e.g., <schedule>) is a child resource of a subscription resource (e.g., <subscription> resource), the <schedule> resource may indicate a time period that is capable of being notified to a notification target.

The embodiment of FIG. 9 may be based on a <schedule> resource that is a child resource of a subscription resource. Also, a subscription resource may be a <subscription> resource. However, this is merely one embodiment of the present disclosure and thus is not limited thereto.

In one embodiment, a scheduling resource, which is a child resource of a subscription resource, may indicate a time period that is notified to a notification target. For example, a time period may be represented in second, minute, hour, day of month, month, day of week and year. For example, as shown in (a) of FIG. 9, an originator requesting a periodic notification may want to receive the notification every hour. In this case, a time period is assumed to be indicated as one hour through an attribute <scheduleElement>. In this regard, it is assumed that a subscription resource (e.g., a <subscription> resource) and a scheduling resource (e.g., a <schedule> resource), which is a child resource of the subscription resource, are generated at 14:38.

Herein, it may be unclear when a first notification will be made. More particularly, in the case of (a) in FIG. 9, a first notification may be made at a random time after a subscription resource and a scheduling resource are generated. In other words, a first notification time may be randomly selected between 14:38 and 15:38 (second notification time). This may be a situation that the originator may not want. The originator may set a periodic notification because the originator wants to receive a preset notification at a preset time at a preset interval.

Accordingly, for a periodic notification like in (b) of FIG. 9, it may be necessary for the originator to set a start time, that is, a time when a first notification is made. In one embodiment shown in (b) of FIG. 9, a first notification time was set to 15:00, and a notification period was set to one hour. In addition, an originator may set a notification expiration time. Although this is related to a pre-existing attribute <expirationCounter> of a subscription resource, a time where a notification expires based on an expiration time, that is, a time which the attribute <expirationCounter> is capable of indicating may be derived only through a series of computational processes.

In addition, when a period is set for making a periodic notification, an originator may not want to receive the notification at a specific time period. For example, when it is assumed that the reception of a periodic notification is rejected from 00:00 AM to 06:00 AM, an excluded time may have to be set.

An attribute of a scheduling resource and the contents of the attribute based on the above necessity will be described below with reference to FIG. 10.

FIG. 10 is a view showing an attribute for setting periodic notification using a scheduling resource in an M2M system according to the present disclosure. In one embodiment, the scheduling resource including an attribute in FIG. 10 may be a <schedule> resource.

In one embodiment, as mentioned in FIG. 8 above, an attribute <scheduleElement> 1001 may be a readable and writable (RW) attribute. In addition, it may comprise seven fields of second, minute, hour, day of month, month, day of week and year and be used to indicate scheduling information with respect to time.

In one embodiment, an attribute < UsageOfscheduleElement> 1002 may be a readable and writable (RW) attribute and indicate a period for a periodic notification, a start time, an expiration time, and an excluded time. For example, as a default value, a period may indicate how periodically the notification will be transmitted or received. In addition, as a start time for transmitting or receiving a periodic notification is indicated by <startTime>, it may represent a start time of the attribute <scheduleElement>. In addition, as an expiration time of a periodic notification is indicated by <endTime>, it may represent a time where the attribute <scheduleElement> ends. Meanwhile, as an excluded time of a periodic notification is indicated by <excludedTimeDuration>, it may represent a time where the attribute <scheduleElement> may not be implemented. In other words, it may represent duration where a periodic notification is not transmitted or received.

Meanwhile, as the name of the above-mentioned attribute is merely one embodiment, it may be set differently. Other things than the above-mentioned contents may be indicated.

Meanwhile, a request or response message, which an M2M entity including M2M apparatus transmits and receives for the above-mentioned periodic notification or local processing reservation, may include an excessive request or response parameter. Since the request or response message is impossible to transmit using one layer-2 frame, a message transmission/reception delay may become serious and a message overhead may increase. Even when an M2M request or response message is capable of being included in one layer-2 frame, since the size of the M2M message itself is enormous, communication via radio channel may increase the possibility of message loss, which is problematic.

Accordingly, when an M2M request or response message is included in a multiplicity of layer-2 frames, only a partial loss of frame may cause failure in transmitting the M2M message itself. This should be avoided with respect to the features of M2M communication.

Herein, parameters included in a multiplicity of consecutive M2M response or request messages may be identical or repetitive, which may unnecessarily increase message overhead. In addition, a resource representation of the parameter <Content> may include an unnecessary attribute that is not required or expected by an originator. Thus, a multiplicity of consecutive M2M request and response messages may include a repeated and identical attribute.

Nevertheless, an M2M service layer does not support a series of compression mechanisms. In addition, a previously-known header compression protocol (e.g., IETF 3095, a robust header compression protocol) may be applied only to a network layer, a transport layer and an application protocol layer. None of the layers is known to be directly applicable to one M2M service layer, which is problematic. Accordingly, when an M2M application wants to repeatedly transmit identical M2M request or response messages to the M2M entity, the M2M application may have to repeatedly transmit a multiplicity of M2M messages to an M2M service layer. This may increase message overhead, aggravate message transmission delay and raise the complexity of M2M application logic.

Therefore, in the present disclosure, a method and apparatus for processing identical contents of request or response messages in an M2M system will be described below with reference to FIGS. 11 to 18. According to the present disclosure, an M2M system may support appropriate request/response messages interaction having low delay and low overhead between an M2M service layer and a limited M2M entity including M2M apparatus. In addition, an M2M system may support an appropriate approaching method and apparatus for a limited M2M entity in order to optimize request or response message communication. An M2M system may support an appropriate approaching method and apparatus for a limited M2M entity in order to delete an unnecessary and repeated attribute from a resource representation that is capable of being included in the parameter <content>. In other words, the present disclosure may support an appropriate approaching method and apparatus for transmitting repeated messages based on a specific condition (e.g., scheduling) in order to minimize message exchange overhead between an M2M system and an M2M application.

Hereinafter, before a process of processing identical contents is described in detail with reference to FIGS. 11 to 18, FIGS. 11 to 18 may be based on a three-level optimization method according to an embodiment of the present disclosure. A three-level optimization method may implement message scripting first in order to minimize the number of messages exchanged between two M2M entities and then remove an unnecessary part in a parameter and an attribute for resource representation. In other words, it may configure a primitive profile of a message and/or a message template. Then, an actual content that is identical with a previously transmitted content may be prevented from being transmitted or the identical content may be properly processed with respect to storage. This will be described in further detail below.

Figure 11:
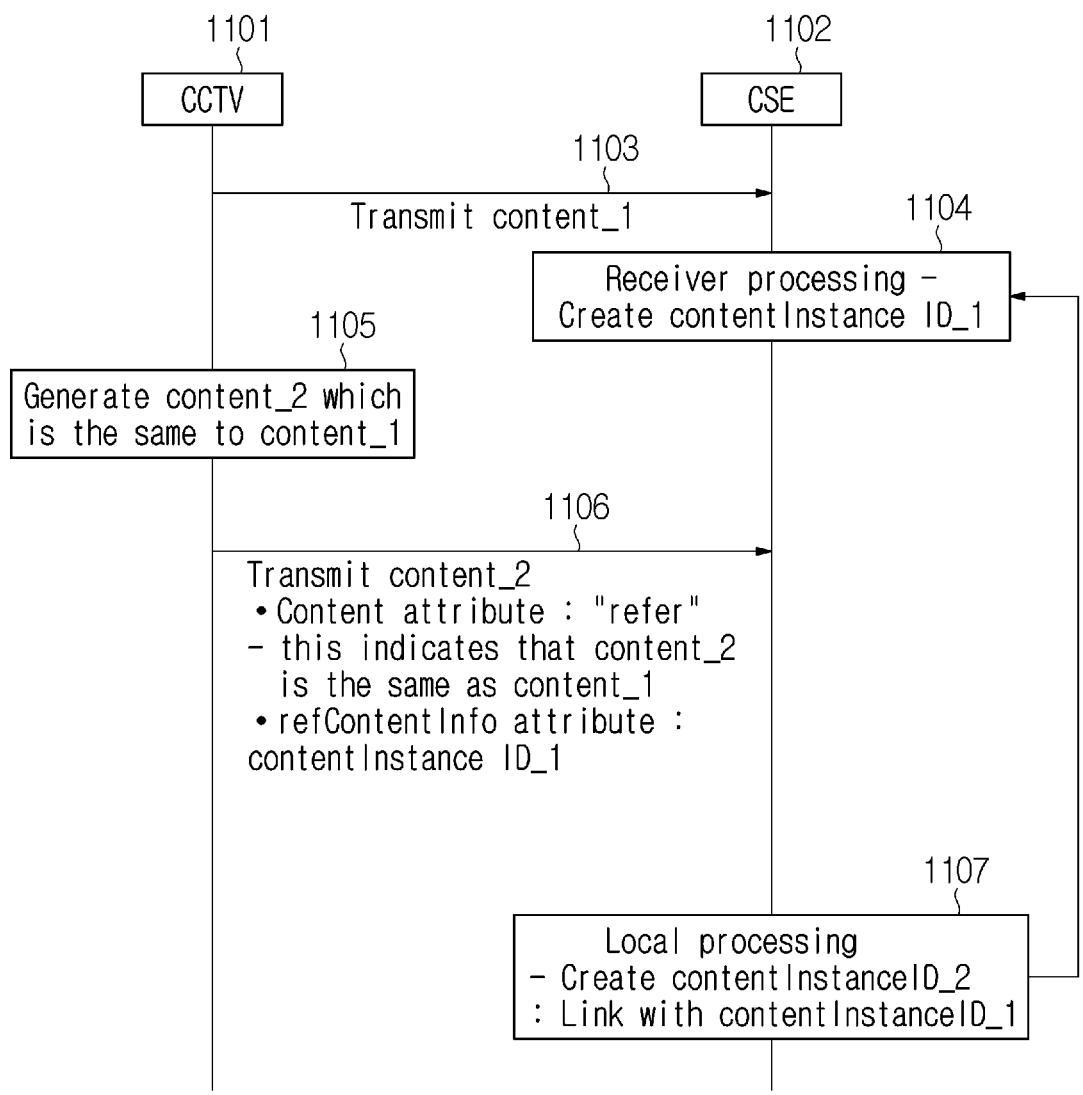
FIG. 11 is a view showing a process of processing an identical content included in a repeated request message in an M2M system according to the present disclosure.

FIG. 11 is a view showing a process of processing a repeated or identical content included in a request or response message in an M2M system according to the present disclosure. More particularly, in one embodiment, it is assumed that a closed-circuit TV (CCTV) camera 1101 transmits a request message including a content to a CSE 1102 in an M2M system including the CCTV camera 1101 and the CSE 1102. In this case, FIG. 11 is a view for explaining a process of indicating that an identical content is included, when creating a request message, in order to efficiently process the identical content transmitted by the CCTV.

In one embodiment, the CCTV 1101 may transmit a request message 1103 including a content to the CSE 1102. This may be a content including image and/or audio data and be represented as content_1.

When receiving the content, the CSE 1102 may generate (1104) the resource <contentInstance> to store content_1. This may be represented as <contentInstance> ID_1. Thus, the CCTV 1101 may create (1105) content_2 including an identical content with content_1 and transmit (1106) content_2 to the CSE 1102. The content_2 may be transmitted in the form of a request message. Herein, as will be described in further detail with reference to FIG. 13, the attribute <content>, which will be included in the request message to be transmitted, may be set as "refer" meaning "reference", and the attribute <refContentInfo> may be represented as "contentInstance ID_1". In other words, as a request message is transmitted which includes information, instead of an actual content, indicating that an identical content with the one included in a previously transmitted request message is included, overhead may be reduced and communication delay may be prevented. When receiving the request message, the CSE 1102 may create (1107) the resource <contentInstance>, express it as <contentInstance> ID_2 and perform local processing to link <contentInstance> ID_2 to <contentInstance> ID_1.

Meanwhile, the names of the attributes are mere examples and thus may be differently set. In addition, the series of processes above may also be related to FIG. 16 and FIG. 17 below.

In addition, as the above description is merely one embodiment, a CCTV may correspond to another CSE, and the description is not limited to a CCTV.

Figure 12:
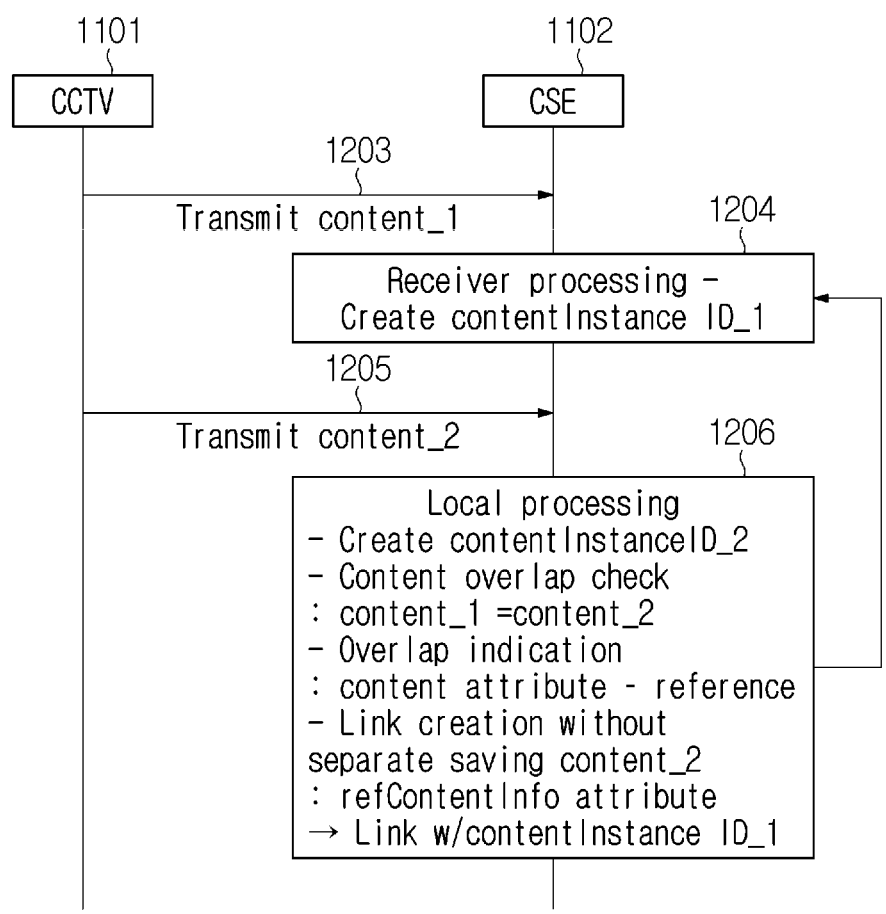
FIG. 12 is a view showing a process of processing a repeated identical content with respect to storage in an M2M system according to the present disclosure.

FIG. 12 is a view showing a process of processing a repeated identical content with respect to storage in an M2M system according to the present disclosure. More particularly, in one embodiment, it is assumed that the closed-circuit TV (CCTV) camera 1101 transmits a request message including a content to the CSE 1102 in an M2M system including the CCTV camera 1101 and the CSE 1102, as shown in FIG. 11 above. In this case, FIG. 12 is a view for explaining a process of efficiently processing an identical content transmitted by the CCTV with respect to storage.

In one embodiment, the CCTV 1101 may transmit a request message 1203 including a content to the CSE 1102. As mentioned above, this may be a content including image and/or audio data and be represented as content_1.

When receiving the content, the CSE 1102 may create (1204) the resource <contentInstance> to store content_1. This may be represented as <contentInstance> ID_1. Thus, the CCTV 1101 may create content_2 and transmit (1206) the content_2 to the CSE 1102. As mentioned above, the content_2 may be transmitted in the form of a request message.

Herein, the CSE 1102 receiving the content_2 may create (1206) the resource <contentInstance> and express it as <contentInstance> ID_2. Herein, the CSE 1102 may perform a content overlap check to determine whether or not the received contents of content_1 and content_2 are identical with each other. In this case, when the contents of the two request messages thus received are identical with each other, it may be represented by using an attribute. For example, as will be described in further detail with reference to FIG. 13, the attribute <content> of <contentInstance> ID_2 may indicate "reference" or "refer". Also, an actual content of content_2 may not be stored in a separate resource but only a link to content_1 may be stored. In this case, the attribute <refContentInfo> may include a link to the resource "contentInstance ID_1" In other words, when a received content is identical with the one included in a previously received request message, the received content may not be directly stored in a resource. Instead, the information that an identical content with a previously transmitted content is included may be managed as an attribute of the resource, and thus a burden with respect to storage may be reduced.

Figure 15:
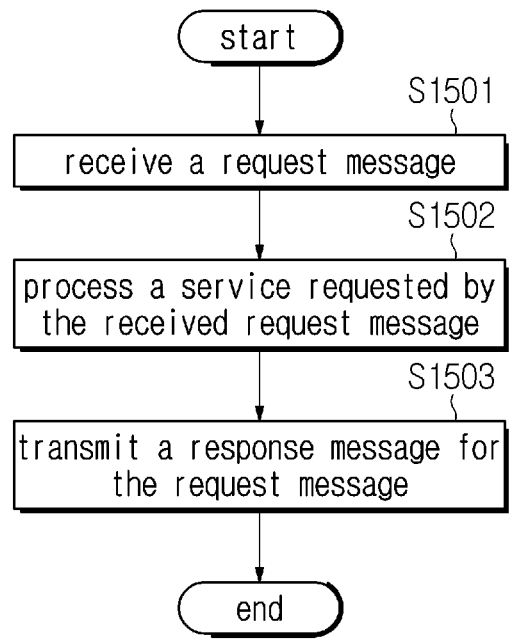
FIG. 15 is a view showing a process where a request message is received by an M2M apparatus in an M2M system according to the present disclosure.
Figure 16:
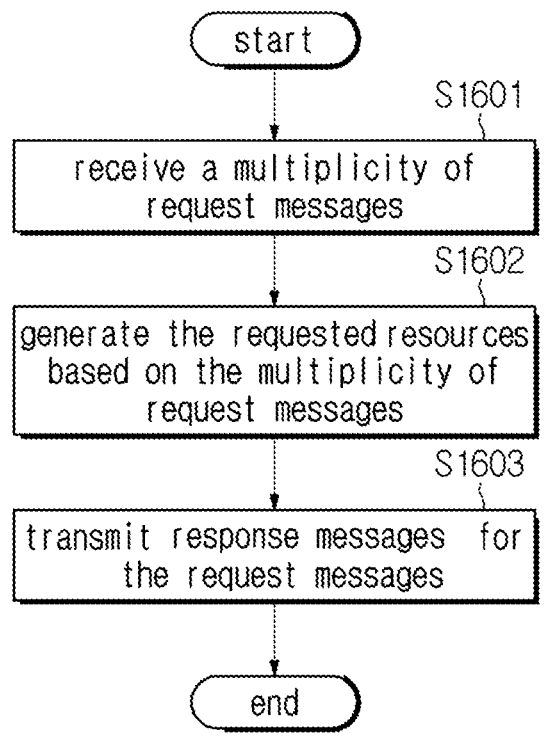
FIG. 16 is a view showing a process where a request message based on an identical content is processed by an M2M apparatus in an M2M system according to the present disclosure.

Meanwhile, the above description may also be related to FIGS. 14 to 16.

FIG. 13 is a view showing an attribute related to processing an identical content in an M2M system according to the present disclosure. In one embodiment, the resource including an attribute in FIG. 8 may be a <contentInstance> resource.

In one embodiment, an attribute <content> 1301 may be related to an actual content of the <contentInstance> resource. Meanwhile, an actual content of the attribute <content> may appear in a manner requiring interpretation based on another attribute (e.g., <contentInfo>) that is not illustrated in FIG. 13. For example, the actual content of the attribute <content> may be an image taken by a CCTV camera or a temperature value measured by a temperature sensor. In one embodiment, when a value of the attribute is indicated as "reference", the actual content may be related to an attribute <refContentInfo> 1302. More particularly, when the attribute <content> 1301 indicates "reference", the attribute <refContInfo> 1302 may indicate other preceding content information, that is, the access information of another resource <contentInstance>.

Meanwhile, as the name of the above-mentioned attribute is merely one embodiment, it may be set differently. Other things than the above-mentioned contents may be indicated.

FIG. 14 is a view showing a process where a request message is transmitted by an M2M apparatus in an M2M system according to the present disclosure.

Before a process of transmitting a request message is described in detail, it needs to be noted that the transmittance process of FIG. 14 is assumed to be performed by an M2M apparatus and an M2M entity for clarity of description but is not limited thereto. Accordingly, the process may be performed through unlimited hardware or software configuration.

In one embodiment, an M2M apparatus may create (S1401) at least one request message and transmit (S1402) the request message to an M2M entity. In this case, the request message may be a message that includes a content containing image and/or audio data, as mentioned above, or requests for resource creation, periodic notification, retrieval of a scheduling resource or a reservation for implementation of local processing. When a request message requests a reservation, the request message may include reservation information including a reservation time and a reservation status. In addition, as mentioned above, the reservation time and the reservation status may be represented as attributes.

Meanwhile, when a request message requests a periodic notification, the scheduling resource may be a child resource of a subscription resource, and the periodic notification may be managed as an attribute. The attribute may be based on information regarding second, minute, hour, day, month, day of week and year for the periodic notification. The attribute may include a duration, a start time, an end time, and an excluded time for the periodic notification. This may be the same as mentioned above.

Meanwhile, when a multiplicity of request messages is created, an actual content may be included only in a single request message among the multiplicity of request messages, and information indicating that the same content as that in the single request message is included may be included in the remaining request messages. Herein, the single request message may be transmitted in preference to the remaining request messages with respect to time. This may be the same as mentioned above.

In addition, the information indicating that the same content is included may be expressed as an attribute. the resources created by the remaining request messages may include a link to a resource created by the single request message. This may be the same as mentioned above.

Meanwhile, when a same content is included invariably in a multiplicity of request messages, an actual content may be stored only in a single resource among the resources created by the multiplicity of request messages, and information indicating that the same content as that stored in the single resource is included may be included in the remaining resources. The information indicating that the same content is included may be expressed as an attribute of the remaining resources. The attribute may include an attribute indicating a link to the single resource. In addition, a resource that is requested to be created by the M2M entity may be <contentInstance>. This may be the same as mentioned above.

Then, when the request message is successfully transmitted, a response message for the request message should be received (S1403) from the M2M entity. In this case, as mentioned above, the response message may indicate whether or not an appropriate service is executed at a request included in the request message for local processing, resource creation, periodic notification, scheduling resource retrieval or storing a content in resource, in other words, whether or not a request is properly processed. Herein, when the response message confirms a reservation, a processing request message may be transmitted at the reservation time to the M2M entity. On the contrary, when the response message notifies that a reservation is rejected, a request message may be created again and transmitted to the M2M entity. The re-created request message may include a reservation time that does not overlap with the preceding reservation time. This may be the same as mentioned above.

Before the M2M entity transmits a response message corresponding to the received request message, the M2M entity may perform a series of processes like executing a service requested by the M2M apparatus. This will be described in further detail below with reference to FIG. 15.

Herein, the M2M entity may include an M2M apparatus processing the received request message of FIG. 15.

In addition, as FIG. 14 is merely one embodiment, another step may be added or the order may be changed, if necessary, and some steps may be excluded.

FIG. 15 is a view showing a process where a request message is received by an M2M apparatus in an M2M system according to the present disclosure.

As mentioned above, the reception process of FIG. 15 may be performed through an M2M entity and the M2M apparatus with hardware or software configuration.

In one embodiment, an M2M apparatus may receive (S1501) at least one request message from an M2M entity. Herein, the request message may be a message that includes a content containing image and/or audio data, as mentioned above, or requests resource creation, periodic notification, retrieval of a scheduling resource or a reservation for local processing.

Then, a service requested by the received request message may be processed (S1502). For example, processing of a requested service may mean local processing. As mentioned above, local processing may include a process of creating information including a scheduling resource retrieved by the M2M apparatus receiving the request message, that is, creating information including a reservation availability time of the M2M apparatus, which is to be transmitted to the M2M apparatus transmitting the request message. In addition, when the request message is intended to make a reservation for the M2M apparatus receiving it, the local processing of the step S1502 may include checking and updating reservation in comparison with reservation availability time based on reservation information included in the request message. Reservation information may include a reservation time or a reservation status. Such local processing may be performed based on an attribute. This may be the same process as described above with reference to FIGS. 6 to 8.

Meanwhile, as another example, when a request message includes a content requesting a periodic notification to an M2M apparatus, a service requested by the request message may be (local) processed (S1502). Processing a service requested by a request message may mean that an M2M apparatus receiving the request message executes a service for periodic notification. For example, based on a notification period and a first notification time that may be included in the request message, an M2M apparatus receiving the request message may set a periodic notification based on a scheduling resource that is a child resource of a subscription resource. This process may be performed based on an attribute and may be the same as described above with reference to FIGS. 9 to 10.

As another example, when a request message includes a content and a multiplicity of request messages is transmitted based on a repeated and identical content though, processing (local processing) (S1502) of a requested service may mean processing for improving message efficiency and reducing message overhead. Herein, for example, as mentioned above, a series of attributes may indicate that an actual content is included in a single request message among the multiplicity of request messages and the same content as that in the single request message is included in the remaining request messages. The local processing herein may include linking the resources created for the remaining request messages to the resource created for the single request message. As another example, when a same content is included invariably in a multiplicity of request messages, as mentioned above, an actual content may be included in the resource for the request message that is received first, and only an attribute linked to the resource for the request message that is received first may be included in the resources for the remaining request messages. In this case, a process of checking whether or not a same content is included in a multiplicity of request messages may be necessary. In other words, a content overlap check may be necessary. This may be the same as described above with reference to FIGS. 11 to 13 and will be described in further detail with reference to FIG. 16.

When appropriate local processing is completed, the M2M apparatus may transmit (S1503) a response message to the M2M entity transmitting the request message. In this case, the response message may include a content that local processing has been properly performed and also information on a related resource or attribute.

Meanwhile, FIG. 15 illustrates only a case where a service requested by a received request message is properly processed. However, when a service requested by a request message is incapable of being processed, that is, when local processing is incapable of being performed, after recognizing the impossibility of processing the service instead of processing the service (S1502), a response message indicating that local processing is incapable of being performed may be transmitted to the M2M entity transmitting the request message.

In addition, as FIG. 15 is merely one embodiment, another step may be added or the order may be changed, if necessary, and some steps may be excluded.

FIG. 16 is a view showing a process where a request message based on an identical content is processed by an M2M apparatus in an M2M system according to the present disclosure. The process of FIG. 16 may also be performed through an M2M entity and an M2M apparatus with hardware or software configuration.

As mentioned above, FIG. 16 is a view illustrating a process of processing a multiplicity of request messages based on a same content with respect to reducing message overhead and with respect to storage efficiency for the content.

First, an M2M apparatus may receive (S1601) a multiplicity of request messages from an M2M entity. A multiplicity of request messages may be based on a same content including identical image or audio data. The multiplicity of request messages may include repeatedly the same content or an attribute indicating that the same content as a previously transmitted request message is included. This may be the same as mentioned above. In addition, the multiplicity of request messages may include a request for creating a resource for storing the content.

Based on the multiplicity of request messages received above, the requested resource may be generated (S1602). This process may include a process of performing local processing based on the generated resource. In one embodiment, as mentioned above, a resource <contentInstance> may be generated. When the received multiplicity of request messages actually includes a same content, it may be necessary for the M2M apparatus receiving a request message to determine whether or not each request message includes the same content. In this case, as mentioned above, an attribute indicating that the remaining request messages also include the same content may be included, and a link to a resource generated by the previously received request message may also be included as an attribute. Meanwhile, another case may occur which includes an attribute indicating that an actual content is included only in a first received request message among the received multiplicity of request messages and the same content as the first received request message is included in the remaining request messages and another attribute representing a link to the first received request message. In this case, as mentioned above, the resources generated by the remaining request messages may include a link to the resource generated by the previously received request message. This may be the same as described above with reference to another view.

Then, a response message may be transmitted (S1603) to the M2M entity transmitting the received multiplicity of request messages. In this case, the response message may include a content that the resource is appropriately generated and necessary local processing is completed.

Meanwhile, unlike the case described above where a resource requested by a received request message is generated and necessary local processing is appropriately implemented, if it is not possible to generate a resource requested by a request message nor to implement local processing, after recognizing the impossibility of resource creation and processing of a necessary service, a response message containing such a content may be transmitted to an M2M apparatus transmitting the request message.

In addition, as FIG. 16 is merely one embodiment, another step may be added or the order may be changed, if necessary, and some steps may be excluded.

Figure 17:
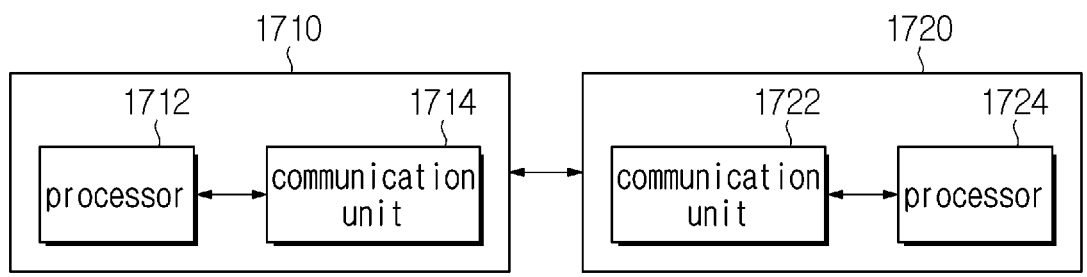
FIG. 17 is a view illustrating an M2M apparatus in an M2M system according to the present disclosure.

FIG. 17 is a view illustrating an M2M apparatus in an M2M system according to the present disclosure. More particularly, FIG. 17 illustrates an M2M apparatus capable of implementing the above-mentioned method of processing a request message according to an embodiment of the present disclosure, that is, a computing system capable of implementing the method and apparatus for processing a request message.

Referring to FIG. 17, an M2M apparatus 1710 may include a processor 1712 controlling the apparatus and a communication unit 1714 transmitting and receiving a signal. Here, the processor 1712 may control the communication unit 1714. Also, the M2M apparatus 1710 may perform communication with another M2M apparatus 1720. The another M2M device 1720 may also include a processor 1724 and a communication unit 1722, and the processor 1724 and the communication unit 1722 may perform the same function as the processor 1712 and the communication unit 1714.

In one embodiment, the communication units 1714, 1722 may be communication modules or communication units and exchange signals with an M2M entity. Herein, the communication units 1714, 1722 may only receive a signal or only transmit a signal or receive and transmit a signal. When the communication units are realized to perform both functions of transmitting and receiving a signal, a communication unit may be realized either by being divided into a transmitter and a receiver or through a single communication unit.

In addition, the processors 1712, 1724, which controls a communication unit or a communication unit, may generate a request message to be transmitted to another M2M apparatus, transmit the request message to the another M2M apparatus, and receive a response message from for the request message from the another M2M apparatus. The request message, as a request for a scheduling resource, may request a reservation for the another M2M apparatus or a periodic notification. When the request message requests a reservation, the request message may include reservation information including a reservation time and a reservation status. When the request message requests a periodic notification, the scheduling resource may be a child resource of a subscription resource. This may be the same as mentioned above.

In addition, the apparatuses 1710 and 1720 of FIG. 17 may be other M2M apparatuses. For example, the devices 1210 and 1220 of FIG. 17 may be communication terminals, devices, apparatuses, vehicles or base stations, or other apparatuses located in an M2M platform. In other words, the apparatuses 1710 and 1720 of FIG. 17 refer to apparatuses capable of performing communication and are not limited to the above-described embodiments.

Also, in one embodiment, although not illustrated in FIG. 17, if described in further detail, each M2M apparatus of FIG. 17 may include a memory including random access memory (RAM) and read only memory (ROM), a processor, a user interface input device, a user interface output device, a storage, a network interface, and a bus.

What is claimed is:

1. A method performed by a machine-to-machine (M2M) apparatus in an M2M system, the method comprising:
   transmitting, to an M2M entity, a first request message for retrieving a scheduling resource;
   receiving, from the M2M entity, a first response message including information on a time period where communication through an underlying network is enabled;
   transmitting, to the M2M entity, a second request message; and
   receiving, to the M2M entity, a second response message corresponding to the second request message,
   wherein the second request message, as a request for the scheduling resource, requests a reservation for the M2M entity or requests a periodic notification based on the time period.

2. The method of claim 1,
   wherein, in case that the second request message requests the reservation, the second request message comprises information on a reservation time and information on a reservation status.

3. The method of claim 2,
   wherein the reservation time and the reservation status are stored at the M2M entity as at least one attribute.

4. The method of claim 2,
   wherein, if the second response message confirms the reservation, a processing request message is transmitted to the M2M entity at the reservation time.

5. The method of claim 2,
   wherein, if the second response message notifies that the reservation is rejected, a third request message is transmitted to the M2M entity, and
   wherein the third request message comprises a reservation time that does not overlap with the preceding reservation time.

6. The method of claim 1,
   wherein, in case that the request message requests the periodic notification, the scheduling resource is a child resource of a subscription resource.

7. The method of claim 6,
   wherein the periodic notification is managed at the M2M entity as at least one attribute, and
   wherein the at least one attribute is based on information regarding second, minute, hour, day, month, day of week and year for the periodic notification.

8. The method of claim 7,
   wherein the at least one attribute comprises a duration, a start time, an end time, and an excluded time for the periodic notification.

9. A method performed by a machine-to-machine (M2M) apparatus in an M2M system, the method comprising:
   transmitting, to an M2M entity, a first request message; and
   transmitting, to the M2M entity, a second request message,
   wherein the first request message requests to generate a first resource related to a content,
   wherein the second request message requests to generate a second resource related to the content,
   wherein the first request message includes the content, and
   wherein the second request message includes an information indicating the first resource without the content.

10. The method of claim 9,
    wherein the first request message is transmitted in preference to the second request message with respect to time.

11. The method of claim 10,
    wherein the information indicating the first resource is stored at the M2M entity as at least one attribute.

12. The method of claim 10,
    wherein the second resource includes a link to a first resource generated by the first request message.

13. The method of claim 9,
    wherein the information is represented as an attribute of the remaining resources.

14. The method of claim 13,
    wherein the attribute indicates a link to the first resource.

15. The method of claim 9,
wherein the first resource or the second resource comprises <contentInstance>.

16. An apparatus for machine-to-machine (M2M) communications in an M2M system, the apparatus comprising:
a communication unit capable of transmitting and receiving a signal; and
a processor capable of controlling the communication unit and configured to:
transmit, to an M2M entity, a first request message for retrieving a scheduling resource;
receive, from the M2M entity, a first response message including information on a time period where communication through an underlying network is enabled;
transmit, to the M2M entity, a second request message; and
receive, from the M2M entity, a second response message corresponding to the first request message, and
wherein the second request message, as a request for the scheduling resource, requests a reservation for the M2M entity or requests a periodic notification based on the time period.

17. The apparatus of claim 16,
wherein in case that the second request message requests the reservation, the second request message comprises information on a reservation time and information on a reservation status.

18. The apparatus of claim 16,
wherein in case that the request message requests the periodic notification, the scheduling resource is a child resource of a subscription resource.

\* \* \* \* \*